United States Patent [19]
Azure

[11] 3,942,157
[45] Mar. 2, 1976

[54] DATA GATHERING FORMATTING AND TRANSMITTING SYSTEM HAVING PORTABLE DATA COLLECTING DEVICE

[75] Inventor: Leo L. Azure, Richland, Wash.
[73] Assignee: Azurdata Inc., Richland, Wash.
[22] Filed: Jan. 22, 1974
[21] Appl. No.: 435,540

[52] U.S. Cl. .............................................. 340/172.5
[51] Int. Cl.² .......................................... G06F 3/04
[58] Field of Search ...................... 340/172.5; 444/1

[56] References Cited
UNITED STATES PATENTS
3,602,902   8/1971   Madden .......................... 340/172.5

OTHER PUBLICATIONS
(S 3141 0103) Foster, L. D. Battery Powered Data Entry Unit, in IBM Tech. Disc. Bull. 15(11): pp. 3437-3438 Apr., 1973.

*Primary Examiner*—R. Stephen Dildine, Jr.
*Attorney, Agent, or Firm*—Staas and Halsey

[57] ABSTRACT

A data gathering and transmitting system includes a portable data gathering device having a keyboard for entering a line of data of predetermined maximum length, a temporary memory for storing the line of data, means for displaying the temporarily stored data to verify its accuracy, and means for transferring the line of data in the temporary memory to a main memory for storage. The system is also capable of calculating and displaying the total number of lines of data that have been transferred to main memory. The system further includes an interface-formatter which is located at a remote terminal in communication with a computer. After data has been collected, the portable data gathering device is connected to the interface-formatter where the stored data is read out and automatically converted and formatted into a form suitable for direct transmission to a computer.

49 Claims, 21 Drawing Figures

FIG. 1D
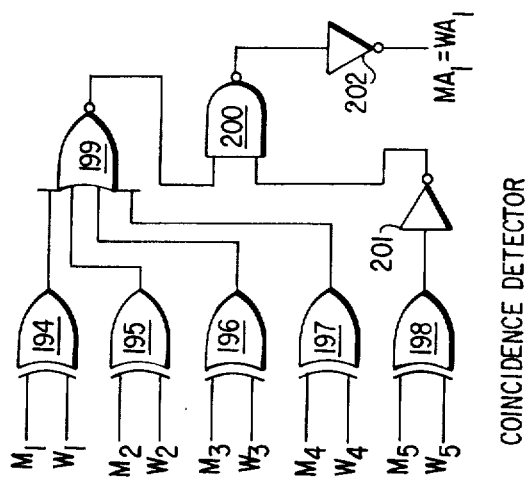
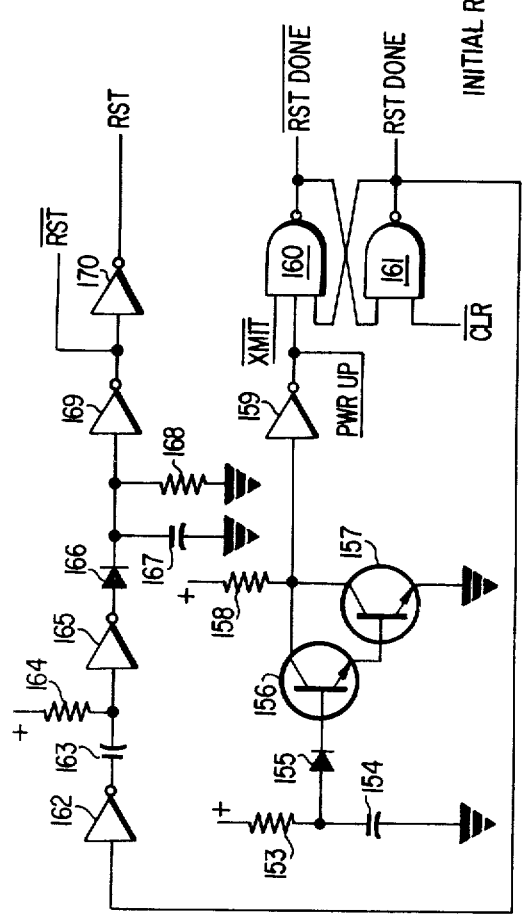
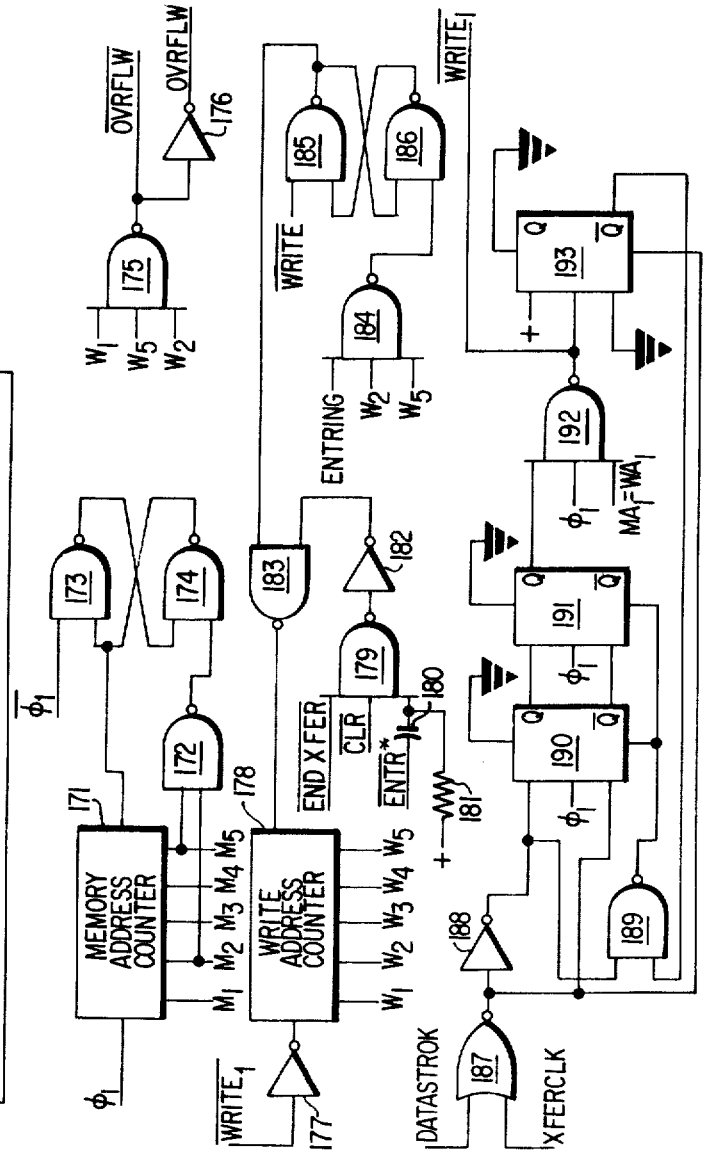

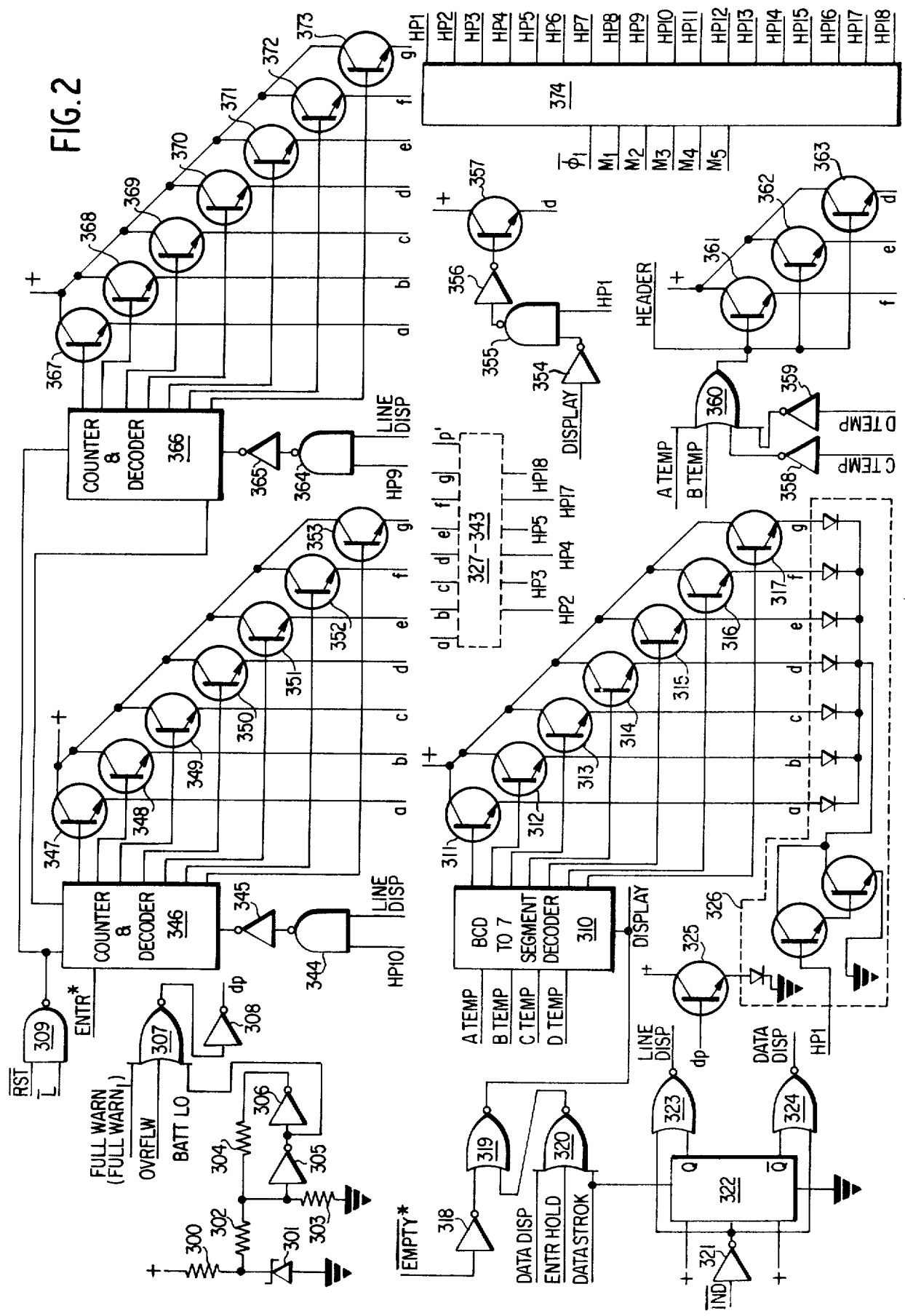

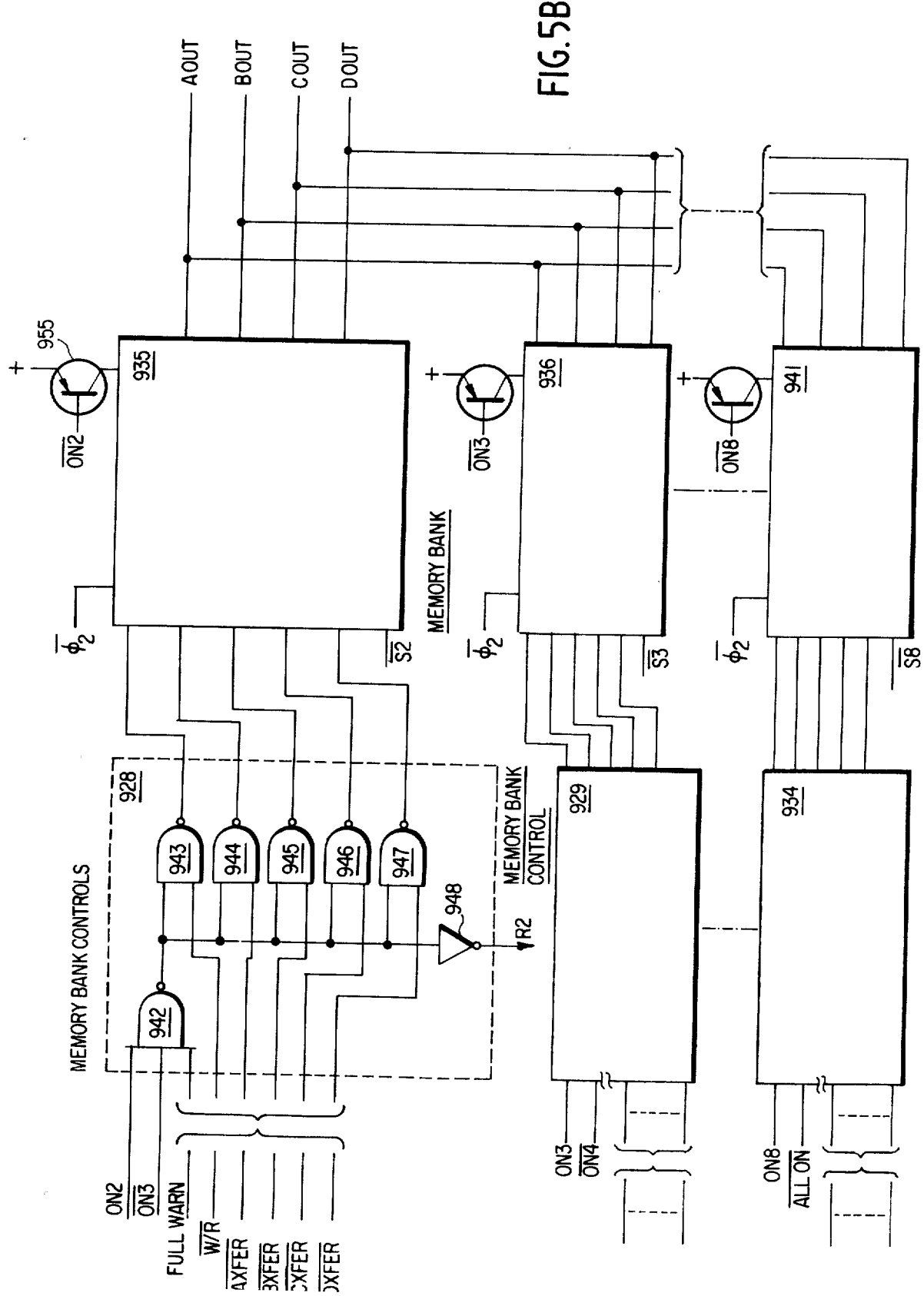

DATA GATHERING FORMATTING AND TRANSMITTING SYSTEM HAVING PORTABLE DATA COLLECTING DEVICE

BACKGROUND OF THE INVENTION

1. Field of the Invention

This invention relates to a data storage and transmission system and, more particularly, to such a system including a hand-held portable device for manually entering and storing a large amount of data and which may be automatically read out at a remote terminal for immediate transmission to a control station; such a device may be characterized as an electronic notebook.

2. State of the Prior Art

In the prior art, the collection or gathering of data, particularly from remote locations for subsequent transmission to a control, presents the problem that the gathered data, at some point in the operation, must be manually translated into computer compatible form. In a typical remote data gathering operation of the prior art, the data first is recorded manually on special forms by personnel out in the field. The forms are then taken to a central facility where the data contained thereon must be converted into computer compatible form, usually by keypunching the data onto computer cards. Manual conversion is extremely costly, is a major source of error, and delays the availability of the data for subsequent processing.

There is thus a great need for what may be termed an electronic notebook, i.e., a device which has the flexibility and adaptability of receiving and storing the entered data but which avoids the entry of erroneous data and facilitates instead entry of correct data. The device moreover must be capable of rapid and accurate readout of the data for subsequent storage and/or processing and avoiding manual conversion.

In general, any process where data is manually collected in the field and later entered into a computer, is a potential application for the present invention. The term "electronic notebook" concisely describes the range of applications.

Raw material inventory control, as in the forest products industry, requires that each log be measured and recorded, along with several descriptions. The speed of processing the raw materials in this and other industries often exceeds that of processing the collected data, with the result that the raw material is turned into finished products before the inventory reports are completed. Other applications include reordering of goods in grocery stores; monitor station reading for pollution control; meter reading in gas and electric utilities; route sales orders, such as for perishable goods distributors; inventory control, production reporting in manufacturing industries; trouble reporting, such as in the police work, highway construction and repair, and telephone and power industries, and data collection in scientific research.

Portable key-to-magnetic tape devices have gained acceptance in certain areas, such as the grocery retail industry for use in reordering inventory, replacing the order forms, mails, and keypunching where the operating environment permits the use of magnetic tape recorders. However, in most applications magnetic tape recording imposes too many constraints. Temperature, shock, water and dust all cause problems to tape recorders. But more importantly, key-to-tape machines do not have the versatility or ease of use to make them widely accepted as electronic notebooks. The size and weight of the tape recorder requires that shoulder straps and slings be used to carry the recorder, and an umbilical cord attaches the recorder to the hand-held keyboard. Further, data recall and random access to data in memory, a must for a true electronic notebook, are not possible with magnetic tape memories. A true electronic notebook, such as the present data collection device, must emulate a note pad in versatility, size and weight, else the man-machine interface problem will limit acceptance - as key-to-tape machines have been limited to grocery stores.

Most of the available key-to-tape units were designed several years ago before many advances in solid state memory technology had occurred. During 1973, some limited feature solid state units have appeared on the market, designed for the grocery store application. They have not been designed as electronic notebooks, but as solid state equivalents to the old magnetic tape units.

Another prior art source data entry means is the optical reader. Herein the source data is marked or written on a document, from which it subsequently is read directly into a computer by an optical reader. Keypunch and other secondary operation costs associated with entering data are eliminated. However, optical reading is viable only where certain constraints can be tolerated. For example, the environmental conditions must assure that the document will not become wet or dirty so as to cause extraneous marks or damage. Operator training in marking the document must be given, and operator consistency must be dependable. Suitable forms must be designed and available. Moreover, greater time is required, since the source documents normally are transported to a central facility for reading and processing. Finally, optical mark reading presents a relatively high error rate, due to character or mark rejections or substitutions.

SUMMARY OF THE INVENTION

The present invention overcomes these and other inadequacies and deficiencies of prior art systems, and offers an economical and accurate means of performing data gathering operations and entering the gathered data into a computer without the necessity of additional human operations. Particularly, the present invention provides for simplified and highly efficient gathering of data, even in remote locations, and includes a handheld, portable, keyboard-to-memory data terminal for collecting data in the field and electronically storing the data in computer usable form for later automatic conversion of the data to a format which is computer compatible, and suitable for transmission to a central store, or directly to a computer. The system also includes a formatter for direct transmission of data from the collection device to a further storage or, where desired, the formatter may be provided at a remote terminal linked through a data communications system to a central computer for transmitting of data from the collection device in a suitably formatted form to the central computer.

In a preferred embodiment, numeric data is entered into the collection device by a keyboard. A large amount of storage is provided in the collection device to permit its use over a desired duration, e.g. a day or two, whereupon the data stored in the data collection device must be retrieved and the device cleared for further collection purposes. A significant aspect of the readout from the collection device into the interface-formatter is that manual transcription and formatting are eliminated, thus avoiding such costly functions as manual compilation, transcription, keypunching and verification as are involved in the typical prior art systems. The present invention may be viewed as a general purpose data entry system, applicable to a broad range of industries and applications. The market can be categorized into two main segments: end users with in-house computers and time-shared computer users.

The present system satisfies a need for data collection and input in both segments, and for data communications in the computer industry in general -- i.e., speeding up data entry.

Time shared-computing is a powerful concept whereby the capabilities of a large general purpose computer are shared via telephone lines by hundreds of remote users. The concept of remote computing is valuable because of the ease and speed of access to computer power. The concept of the system of the invention enhances the time-share concept by providing fast remote entry of source data. The data collection device is compact in size, is powered by a rechargeable battery, and uses a minimum of power, making the device ideally suited for portable operation, and thus has application in both segments.

The data collection device comprises three basic subsystems: a temporary memory, a display system, and a main memory.

In one embodiment, the temporary memory comprises four 18 character shift registers operating in a recirculating mode. Data entry is effected by depressing the appropriate ones of numeric keys on a keyboard, a decimal-to-BCD decoder converting the numeric value of each depressed key to a 4 bit BCD word, the 4 bits of each data word being supplied to the inputs of the respectively associated recirculating shift registers. The control circuits for the input of data to the temporary memory include a memory address register of a corresponding number of bits as one of the temporary memory registers, and which recirculates in synchronism therewith. Additionally, there is provided a write address register which increments each time a numeric key of the keyboard is depressed. Control circuits monitor both the memory address and the write address registers to produce a coincidence signal which indicates that the temporary memory, in its recirculating cycle, currently is at the address specified by the write address register as being the next address into which new data is to be entered. Logic circuits also require that the appropriate conditions for entry of data be established in conjunction with the occurrence of the conicidence signal to permit entry of each such new BCD data item into the temporary storage.

The display circuit is selectively enabled by the user for displaying either the data currently stored in the temporary memory or the number of lines of data which currently are stored in the main memory. The display correspondingly includes 18 individual numeric display positions, corresponding to the 18 word temporary storage, preferably implemented by light emitting diodes (LED's) configured for a typical seven segment font display. The 18 LED's are pulsed in synchronism with the recirculation of the temporary memory and each LED is activated to display the character in the corresponding position of the temporary memory. The response time of the LED's is sufficiently fast that, with regard to the frequency of the pulsing and thus the recirculation rate of the temporary memory, a flicker-free display of the data in the temporary memory is presented to the user.

The main memory comprises recirculating shift registers and in a low capacity device may comprise four such registers, each with a capacity of 1,024 bits and thus a capacity of 1,024 four bit BCD numeric characters. In normal use of the device, after a line of data is entered into the temporary memory and displayed, for verification, the user depresses an ENTER key on the device whereupon the data is transferred from the temporary memory to the main memory. Where an error exists in the line of data in the temporary memory, as evidenced by the display, the temporary memory is cleared and that line is re-entered with a verification check for accuracy whereupon it is then entered into the main memory. Once in main memory, the data cannot be retrieved or corrected until transmitted. The transfer function from temporary to main memory again requires identification of the next available position in the parallel recirculating shift registers. This function is achieved by the provision of memory and write address registers and associated coincidence logic substantially corresponding to the control circuits for data entry into the temporary memory. A line counter is provided to count the number of lines entered into the main memory, which line count may be displayed as previously noted. Likewise, an alarm display is provided for the condition that the main memory is near overflow.

The main memory of a second embodiment of the data collection device may contain a multiple of the capacity of the device as aforedescribed through the provision of multiple sets of recirculating shift registers. One specific such embodiment contains 8 such shift registers thereby providing 8 times 1,024 character storage capacity. To minimize power consumption where multiple sets of main memory shift registers are employed, power is supplied to each set of shift registers only as it is brought into use.

The interface-formatter, as above noted, retrieves data from the main memory store of the data collection device and transmits that data to some further utilization device. Although local storage on magnetic tape is one technique, more typically the interface-formatter supplies the data for transmission to a central computer, such as by driving a teletype or other standard terminal. whereas several output interfaces are available, as one example, the transmission may be in ASCII at selectable baud rates from 110 baud to 1200 baud. The interface-formatter includes appropriate control circuits for interjecting SPACE's, carriage return (CR), and line feeds (LF), at pre-programmed positions in the output data stream. The interface-formatter as well provides the necessary conversion from the parallel character storage of main memory to a serial format for transmission. The formatter, in like manner, includes necessary counting and logic circuits for timing the bits in the output bit stream, for counting the characters in each line of data and determining in light of the accumulated count the positions in which to insert SPACE's, for detecting the count of each line and for counting the number of lines to determine the positions for inserting the CR, LF, and like characters.

BRIEF DESCRIPTION OF THE DRAWINGS:

FIG. 1b is a plot of waveforms representing signals at various positions throughout the circuit of FIG. 1a.

FIG. 1d is a block diagram of various control circuits for the temporary memory of FIG. 1c.

FIG. 2 is a block diagram of the energization and logic selection circuits including counters and decoders employed for energizing the display elements in an illustrative seven segment character display for an 18 character display line comprising one embodiment of a display for use with the data holder device of the invention.

FIGS. 5a and 5b illustrate a multiple memory bank embodiment of the invention affording increased memory capacity while minimizing power consumption.

DATAILED DESCRIPTION OF THE INVENTION:

As used herein, zero volts is a 0 logic level, and a positive voltage, significantly greater than zero, is a 1 logic level.

Figure 1A:
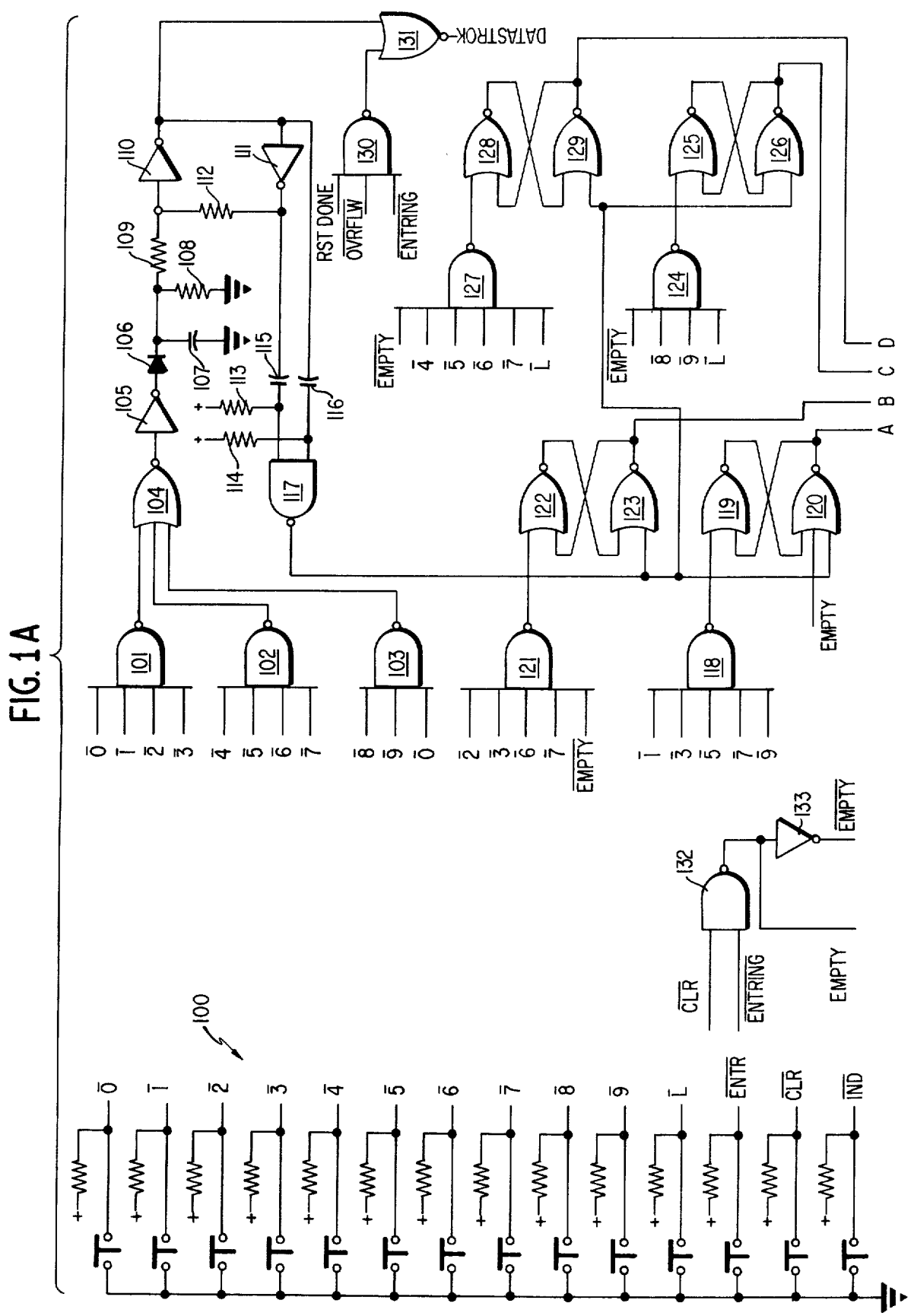
FIG. 1a illustrates the keyboard and the outputs therefrom responsive to actuation of both data and control pushbuttons thereon.

In FIG. 1a, the keyboard 100 includes a plurality of switches, the outputs of the numeric switches, $\overline{0}$ to $\overline{9}$, and switch $\overline{L}$, being connected to the inputs of NAND gates 101, 102 and 103, as shown. Hereinafter, the numeric and L pushbuttons will be referred to as "data" pushbuttons, and the other pushbuttons as "control" pushbuttons.

Figure 1B:
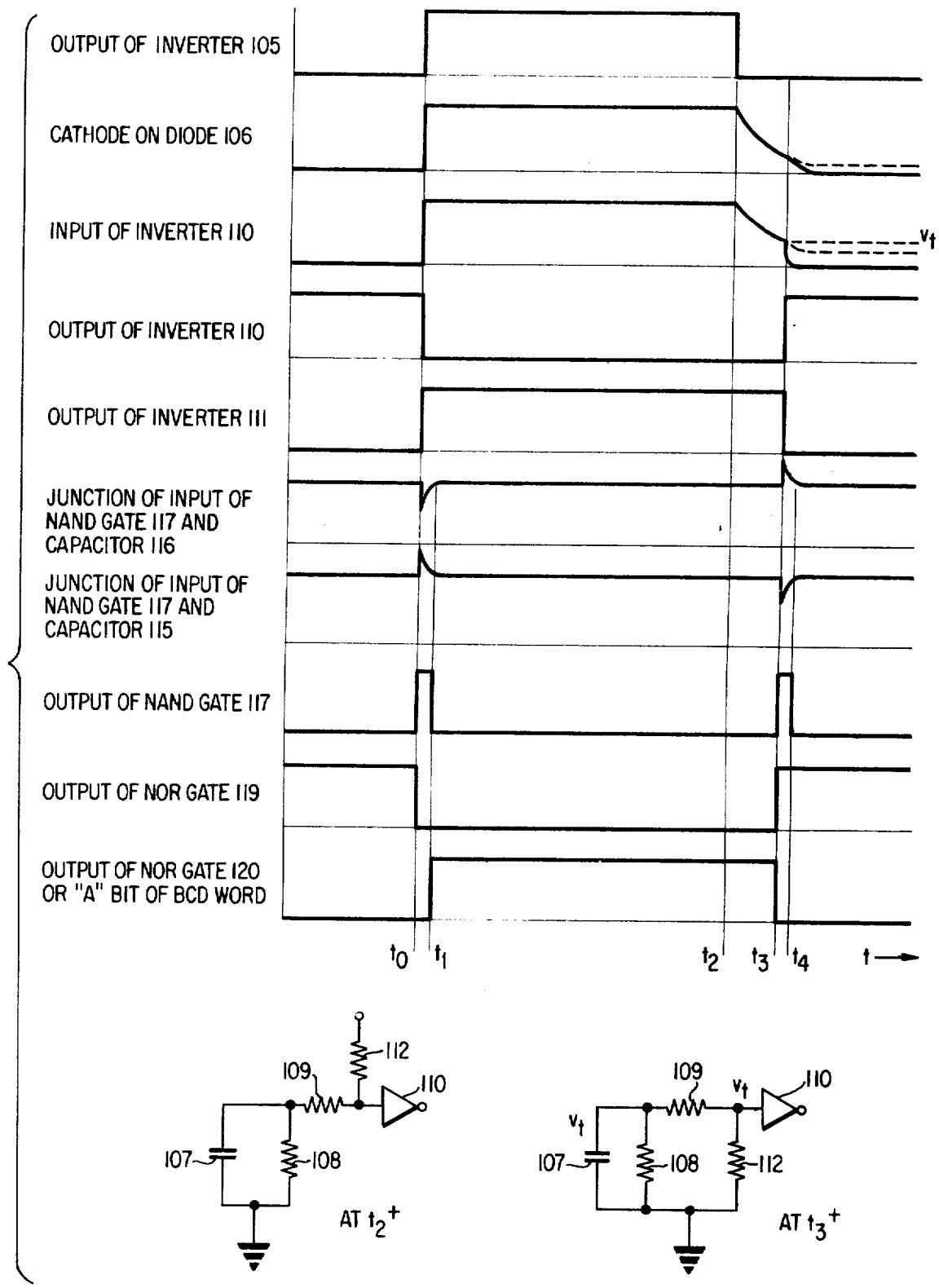

With reference to the waveforms of FIG. 1b, if any "data" pushbutton is pressed at $t_0$, the output of the corresponding one of NAND gates 101, 102 or 103 causes NOR gate 104 to output a 0 and inverter 105, in turn, to output a 1, the latter remaining a 1 only while a data pushbutton is depressed. The cathode of diode 106 rises to 1 in a relatively short time, due to the low output impedance of inverter 105, raising the input to inverter 110 to a 1. Inverter 110 thereby outputs a 0 and drives the output of inverter 111 to 1, the 1 output of inverter 111 being fed back to the input of inverter 110. This feedback, by virtue of the averaging effect of capacitor 107, maintains the input to inverter 110 at 1, even if the pushbutton switch is momentarily opened due to "switch bounce".

At $t_2$, when the pushbutton switch is released, the output of inverter 105 returns to 0. Since diode 106 is now back-biased, capacitor 107 discharges through resistor 108 and resistor 109 in series with the input of inverter 110. At $t_3$, the input voltage to inverter 110 has fallen to $v_t$, and inverter 110 outputs a 1, inverter 111 then outputting 0. The change from 1 to 0 at the output of inverter 111 immediately drops the input voltage to inverter 110 well below $v_t$, and capacitor 107 fully discharges. The outputs of inverters 110 and 111 are differentiated by RC circuits 113 to 116, the 1 to 0 transitions of inverters 110 and 111 thereby producing short pulse outputs from NAND gate 117.

The overall function of this circuit is, then, to produce two short pulses whenever a "data" pushbutton is pressed, one pulse occurring when the pushbutton is first pressed, and the other one occurring a short time after the pushbutton is released. Also, if NAND gate 130 detects RST DONE, $\overline{OVRFLOW}$ and $\overline{ENTRING}$, NOR gate 131 produces a DATASTROK pulse, the leading edge occurring when the pushbutton is first pressed and remaining at 1 until the start of the second pulse from NAND gate 117 which occurs a short time after the pushbutton is released.

As will hereinafter be explained, if the CLR pushbutton is not pressed after data has been transferred from the dataholder to the interface-formatter, or after power-up, RST DONE will be 0. This will produce a 1 at the output of NAND gate 130, disabling NOR gate 131 and preventing the DATASTROK output. The keyboard thereby is "locked-up" to prevent the entry of new data over old data, until CLR is pressed to initialize the memories.

The outputs of the "data" pushbuttons are also connected to a decimal to binary coded decimal (BCD) converter consisting of elements 118 through 129. The BCD word contains 4 bits designated as A, B, C, and D, with A being the least significant bit. Since all four bits are converted from decimal to BCD by identical circuits, an explanation of the circuit for bit A will suffice as an explanation for all 4 bits. Accordingly, the output of NAND gate 118, normally 0, will rise to 1 whenever pushbutton 1, 3, 5, 7, or 9 is pressed.

NAND gates 119 and 120 form a flip-flop which is set by a 1 output from NAND gate 118, and reset by the pushbutton release pulse output from NAND gate 117. EMPTY is normally 0 during data entry. Thus, when a data pushbutton (1, 3, 5, 7, or 9) is pressed, the flip-flop is set and output (A) is 1.

The pulse output of NAND gate 117 upon pushbutton release resets the flip-flop and the output (A) returns to 0.

EMPTY is produced by NAND 132 in response to either $\overline{CLR}$ or $\overline{ENTRING}$, inverter 133 producing the complement, $\overline{EMPTY}$. EMPTY, at logic 1, holds the A bit flip-flop (119, 120) reset and $\overline{EMPTY}$ holds the B (122, 123), C (125, 126), and D (128, 129) flip-flops in their set conditions. Thus, the BCD output (of bits A, B, C, and D) is 0111 whenever $\overline{CLR}$ or $\overline{ENTRING}$ is 0.

Figure 1C:
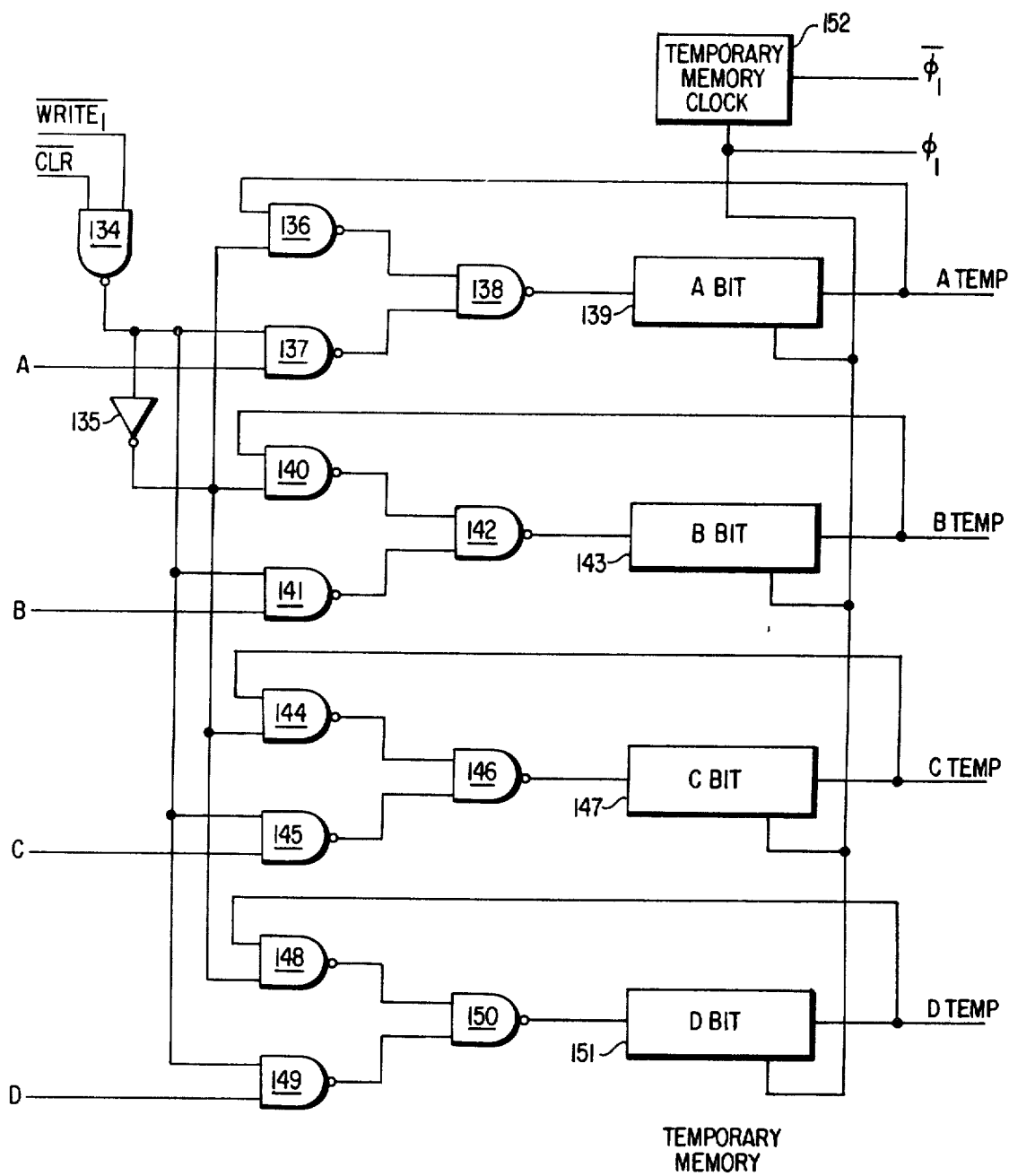
FIG. 1c is a block diagram of a temporary memory employed in the device and illustrating the data entry and recirculating logic gating loops for the recirculating shift registers comprising the temporary memory.

FIG. 1C illustrates the four recirculating shift registers of the temporary memory; since all four shift register circuits are identical, the operation of only the bit A register is explained. $\overline{CLR}$ is always 1 unless the CLR pushbutton switch is closed. $\overline{WRITE_1}$ also is 1 when the shift register is in its data recirculating (non-entry) mode. Therefore, the output of NAND gate 134 normally is 0, NAND 137 normally outputting 1 regardless of the level of A. For this condition, inverter 135 outputs a 1; NAND gate 136 thus inverts the A TEMP output of register 139 and supplies A TEMP to gate 138. Since A is 0, NAND gate 137 outputs a 1 to NAND gate 138 and the latter therefore recirculates $\overline{A}$ TEMP to the input of register 139.

In the data entry mode, assume that A is to be entered into memory. $\overline{WRITE_1}$ briefly falls to 0 in coincidence with the leading edge of the clock pulse $\phi_1$ NAND gate 134 outputs a 1 and inverter 135 outputs a 0. NAND gate 136 then outputs 1 and NAND gate 137 outputs $\overline{A}$. NAND gate 138 thus supplies A as the input to shift register 139, and A is read into the input stage of shift register 139 by the leading edge of the next occurring clock pulse. Before the trailing edge of that clock pulse, $\overline{WRITE_1}$ returns to 1, disabling NAND gate 137 and enabling NAND gate 136 to allow shift register 139 to recirculate.

Shift registers 139, 143, 147 and 151 contain 18 bit storage positions, or stages, and advance one stage at every clock pulse. The shift rate is determined by the frequency of temporary memory clock 152. The temporary memory control circuitry, as well as some initial reset circuitry, is illustrated in FIG. 1D. The function of the control circuitry is to monitor the location of data in the temporary memory and to generate a $\overline{WRITE_1}$ pulse for, among other things, incrementing the write address counter and reading data into temporary memory.

The DATASTROK line is normally 0, but rises to 1 when a "data" pushbutton switch is closed, and remains in that state for a short time after the switch is opened. When data is being entered into temporary memory the XFERCLK line is normally 0.

Prior to the occurrence of a DATASTROK pulse, the output of NOR gate 187 is 1 and flip-flop 193 is reset. The 0 output from inverter 188 places a 1 on the output of NAND gate 189 thereby holding flip-flops 190 and 191 in their reset mode. A DATASTROK pulse causes the output of NOR gate 187 to fall to 0 and the output of inverter 188 to rise to 1. This produces a 0 at the output of NAND gate 189 enabling the 1 at the output of inverter 188 to set flip-flops 190 and 191 on the next successive clock pulse. After the end of the second clock pulse the Q output of flip-flop 191 will be 1. Thereafter, when the memory address coincides with the write address at some future clock pulse, the MA$_1$ = WA$_1$ input to NAND gate 192 rises to 1 and $\overline{WRITE_1}$, the output of NAND gate 192, falls to 0. This 1 to 0 transition sets flip-flop 193, placing a 0 on its $\overline{Q}$ output and causing the output of NAND gate 189 to rise to 1, resetting flip-flops 190 and 191. The Q output of flip-flop 191 is now 0 and $\overline{WRITE_1}$ returns to 1.

It can be seen, then, that after the DATASTROK pulse occurs, the $\overline{WRITE_1}$ pulse will occur on the leading edge of the first clock pulse at which the write address is equal to the memory address. When the DATASTROK returns to 0, the output of NOR gate 187 returns to 1, resetting flip-flop 193.

Memory address counter 171 counts the number of clock pulses that occur and produces a BCD output of bits $M_1$, $M_2$, $M_3$, $M_4$, and $M_5$ respectively corresponding to $2^0$, $2^1$, $2^2$, $2^3$, and $2^4$. When both $M_2$ and $M_5$ are 1 ($2^1 + 2^4 = 18$) the output of NAND gate 172 falls to 0, setting the flip-flop formed by NAND gates 173 and 174. The 1 at the output of NAND gate 174 resets counter 171 to zero. The falling edge of the 18th clock pulse resets the flip-flop formed by NAND gates 173 and 174 and the next clock pulse resumes the count. Since the 18 character temporary memory shifts one character each clock pulse, the output of counter 171 designates the position of data in the temporary memory.

Write address counter 178 counts the number of $\overline{WRITE_1}$ pulses that occur at the output of inverter 177 and produces the BCD output of bits $W_1$, $W_2$, $W_3$, $W_4$, and $W_5$. Since every $\overline{WRITE_1}$ pulse reads one character into the 18 character, four bit recirculating memory, the output of counter 178 designates the number of characters that have been read into memory. A 1 at the output of NAND gate 183 resets counter 178 to 0. This occurs when either the output of inverter 182 or the output of the flip-flop formed by NAND gates 185 and 186 is 0. Accordingly, write address counter 178 will be reset whenever either CLR, ENDXFER or the falling edge of ENTR*, differentiated by capacitor 180 and resistor 181, is detected by NAND gate 179, or upon the 18th count ($W_2 = W_5 = 1$) if ENTRING is 1 as detected by NAND gate 184.

Exclusive OR gates 194 through 198 are used to detect coincidence between the output of memory address counter 171 and the output of write address counter 178. When the corresponding BCD bit position outputs for counters 171 and 178 are either both 1 or both 0 (e.g., $M_n = W_n = 0$ or $M_n = W_n = 1$) the outputs of their corresponding exclusive OR gates, (e.g. as to $M_1$ and $W_1$ exclusive OR gate 194) normally at 1, falls to 0. When all five bits of both counters (171 and 178) are equal, all four inputs to NOR gate 199 will be 0, and the output of inverter 201 will be 1. The output of NAND gate 200 will therefore be 0, placing a 1 at MA$_1$ = WA$_1$, the output of inverter 202.

In operation, the CLR pushbutton is initially pressed, resetting counter 178 to 0. During this time counter 171 is repetitively counting clock pulses up to 18 and then resetting to 0. When the first "data" pushbutton is pressed, a $\overline{WRITE_1}$ pulse will occur when the output of counter 171 is at 0, which allows the numeric, in BCD form, to be read into the first character position in temporary memory, and increments counter 178 to indicate that there is now a character in temporary memory. When another data pushbutton is pressed another $\overline{WRITE_1}$ pulse is produced, this time when the output of counter 171 is at 1, which increments counter 178 to 2, and allows the numeric to be read into the second character position in temporary memory. For the illustrative embodiment of 18 character positions in temporary memory, when counter 178 is incremented to 19, the output of NAND gate 175 falls to 0, producing a 1 OVRFLW signal at the output of inverter 176.

For initial reset, as shown in FIG. 1D, when power is applied initially, $\overline{CLR}$ is 1. Capacitor 154 charges through resistor 153, to a level causing current flow through diode 155 to saturate transistors 156 and 157. The resulting 0 input to inverter 159 produces a 1 output. Thus, when power is initially applied, the output of inverter 159 is initially 0, but switches to 1 a short time thereafter. However, while the output of inverter 159 is 0, the output of NAND gate 160, as well as $\overline{CLR}$, will be 1 thereby producing a 0 at the output of NAND gate 161. When the output of inverter 159 rises to 1 a short time after initial power up, the output of NAND gate 160 will remain at 1 due to the 0 at the output of NAND gate 161. However, as soon as CLR is pressed, RST DONE is set to 1 and remains at 1 either until power is turned off, or $\overline{XMIT}$ falls to 0. When NAND gate 161 switches from 0 to 1, inverter 162 switches from 1 to 0. This transition is differentiated by resistor 164 and capacitor 163 to produce a short positive going pulse from the normally 0 output of inverter 165 which quickly charges capacitor 167 through diode 166. When the output of inverter 165 returns to 0, diode 166 will be back biased, and capacitor 167 will discharge through resistor 168 and the input of inverter 169. Therefore, the normally 1 output of inverter 169 falls to 0 and remains there for a period of time before returning to 1, thereby producing a positive going RST pulse from the output of inverter 170. As will be hereinafter explained, the RST pulse sets flip-flop 428, 437 to make $\overline{XMIT}$ 1.

Figure 1E:
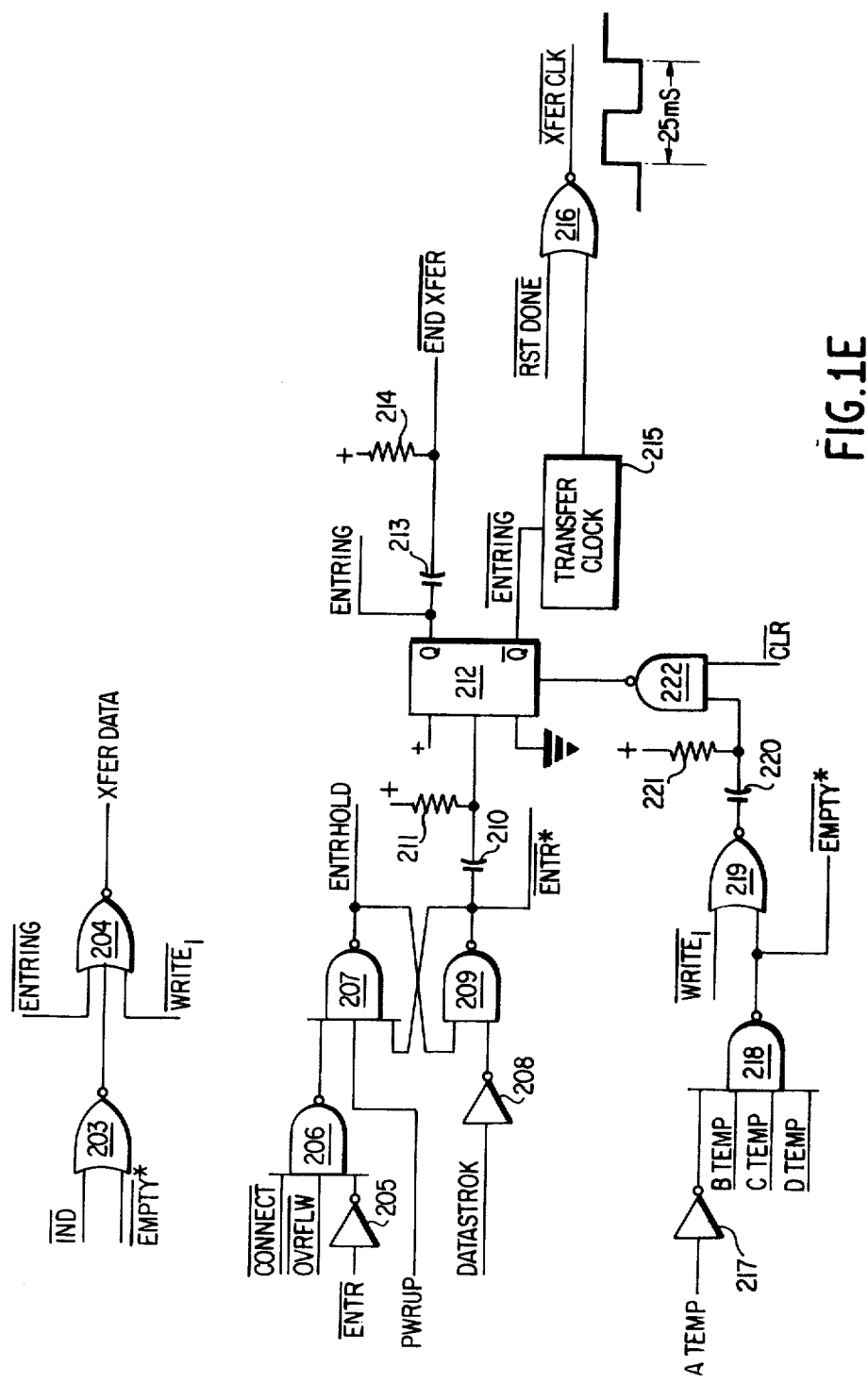
FIG. 1e is a block diagram of the circuits of the device which control transfer of data from the temporary memory to the main memory.

The circuitry for controlling the transfer of data from temporary memory to the main memory is illustrated in FIG. 1E. The CLR pushbutton switch is initially closed thereby placing a 1 on the output of NAND gate 222 and resetting flip-flop 212. On the first entry into temporary memory of "data," the accompanying DATASTROK pulse places a 0 at the output of inverter 208 thereby placing a 1 at the output of NAND gate 209 and resetting the flip-flop formed by NAND gates 207 and 209. When the contents of the temporary memory are to be transferred to the main memory, the ENTR pushbutton switch is closed, placing a 1 at the output of inverter 205. If $\overline{CONNECT}$ and $\overline{OVRFLW}$ are both 1, the output of NAND gate 206 falls to 0 setting the flip-flop formed by NAND gate 207 and 209 and thus making ENTRHOLD 1 and $\overline{ENTR*}$ 0. $\overline{CONNECT}$ will be 1 at that time if the data collection device is not connected to the interface-formatter, and $\overline{OVRFLW}$ will be 1 if there has been no attempt to enter more than 18 characters into temporary memory. When the output of NAND gate 209 ($\overline{ENTR*}$) falls to 0, the transition will be differentiated by capacitor 210 and resistor 211 thereby clocking a 1 to the Q output of flip-flop 212. Transfer clock 215 will be activated by the 1 from flip-flop 212 and the output from transfer clock 215 will continue until flip-flop 212 is reset either by pushing the CLR pushbutton or by the occurrence of a $\overline{WRITE_1}$ pulse when the output of temporary memory is 0 111 as detected by NOR gate 219. Since flip-flop 212 can only be set by the 1 to 0 transition of NAND gate 209, the flip-flop formed by NAND gates 207 and 209 must be reset before $\overline{ENTRING}$ can return to 0. That is, before $\overline{ENTRING}$ can return to 0 after flip-flop 212 has been reset, "data" must be entered into temporary memory to produce a DATASTROK pulse for resetting the flip-flop formed by NAND gates 207 and 209.

If CLR has not been pressed after transfer of data from the dataholder to the interface-formatter, or after initial power-up, $\overline{RST\ DONE}$ will be 1 thereby disabling NOR gate 216 to prevent new data from being written on top of data already contained in main memory. However, if CLR has been pressed $\overline{RST\ DONE}$ will be 0 and the transfer clock pulses will thus appear at the output of NOR gate 216.

Referring once again to FIGS. 1C, 1D and 1E, the 40 Hz square wave XFERCLK is applied to the input of NOR gate 187. The other input to NOR gate 187 is DATASTROK which is 0 whenever data is not being entered into temporary memory. The circuit will respond to a XFERCLK pulse in the same manner that it responds to a DATASTROK Pulse as discussed earlier. That is, after a XFERCLK leading edge a $\overline{WRITE_1}$ pulse will be produced upon the first clock pulse after the write address equals the memory address. The $\overline{WRITE_1}$ pulse thus produced will increment the write address counter 178 by placing a 1 at the output of inverter 177, will reset the flip-flop formed by NAND gates 185 and 186, if it was previously set by a count of 18 having been reached on counter 178, thereby allowing the count to resume, will generate a XFER DATA pulse from the output of NOR gate 204 as long as the $\overline{IND}$ pushbutton is not pressed or EMPTY* is 1, and will open the recirculation path of recirculating shift registers 139, 143, 147 and 151 to allow the contents of the input buffer found on the output of NOR gates 118, 121, 124 and 127 to be read into temporary memory. Since ENTRING is 0 during this time, the contents of the buffer will be 0111. Thus, as each character is read out of temporary memory, a 0111 will take its place.

Let it be assumed that a number of characters are contained in temporary memory. The ENTR pushbutton switch is then closed causing the output of NAND gate 209 to fall to 0 thereby setting flip-flop 212 producing a 0 at its $\overline{Q}$ output. The output of NOR gate 216 now becomes a 40 Hz square wave. The 1 to 0 transition of ENTR* from the output of NAND gate 209 is also applied to the input of NAND gate 179 to reset the write address counter 178 to 0. When the output of the memory address counter 171 is equal to 0, a $\overline{WRITE_1}$ pulse is produced. This $\overline{WRITE_1}$ pulse increments write address counter 178 to 1, resets the flip-flop formed by NAND gates 185 and 186, generates a XFER DATA pulse which reads the contents of the first character position of the temporary memory into a main memory buffer, and places a 0111 in the first character position of the temporary memory. On the second and subsequent leading edges of XFER CLK, the second and subsequent character positions of temporary memory will be read out of the temporary memory and filled with 0111. If the temporary memory initially contained less than 18 characters, for example 8, the first "empty" character position will contain 0111, placed there either by previously pressing the CLR button or by the previous readout and consequent filling of the temporary memory with 0111. Therefore, after the eighth character is read the write address counter 178 is incremented to 9. After the next leading edge of XFER CLK, when the memory address counter 171 also reads 9, a $\overline{WRITE_1}$ pulse will be produced. Since the contents of position 9 of the temporary memory is 0111, the output of NAND gate 218 will be 0, and the end of the $\overline{WRITE_1}$ pulse will thereupon reset flip-flop 212, thereby disabling transfer clock 215 and holding the output of NOR gate 216 at 0. Thereafter, no more XFER CLK Pulses may be produced until new data is entered into temporary memory to reset the flip-flop formed by NAND gates 207 and 209. The 0111 in the ninth position will be read into main memory to serve as an indication of the end of a record. The resetting of flip-flop 212 will also cause a negative going END XFER pulse to be applied to the input of NAND gate 179 in order to reset the write address counter 178 back to 0. The temporary memory is now ready to receive new data.

If, instead of there being only eight characters in temporary memory, it initially contained 18 characters, the 0111 placed in the first position when the first character was read would be detected in the same manner as 0111 was detected in the ninth position, thereby producing the same result.

The circuit used for displaying the contents of the temporary memory, as well as the number of data entries in each header, is illustrated in FIG. 2.

The outputs of the temporary memory are applied to the inputs of the BCD to seven segment diode decoder 310. The outputs of decoder 310 drive emitter follower transistors 311 through 317 which in turn drive the respectively corresponding diodes (a) to (g) of all 18 displays, shown as 326 to 343. However, only one of the 18 displays is enabled to emit light from one or more of its LED's, in accordance with the (a) to (g) outputs, by selective energization through the HP1 to HP18 display power enable inputs. For example, HP1 is shown as supplied to the Darlington transistors in display 326.

HP1 through HP18 are outputs of BCD to decimal decoder 374. The inputs to the decoder are the inverse of the memory clock $\bar{\phi}_1$ and the outputs of the memory address counter 171. Therefore, each of the 18 displays is enabled in succession for one clock pulse period in synchronism with the recirculation of temporary memory, for the corresponding data/display position. The frequency of the pulsing, coupled with the fast response of the light emitting diodes, presents a flicker-free display to the viewer.

In use of the device, a header L is first keyed in to indicate a header for a block of data to follow. Each block comprises a line, or record, each up to a maximum of 18 characters. After each line of data has been entered into temporary memory, and automatically displayed as above noted for check of accuracy, the operator presses the ENTER button to transfer that record to main memory. The system provides for automatically counting the number of lines, or records, of data entered for each header, which count can then be displayed by actuation of the indicator button. The disclosed system permits a display of a number of such lines, or records, of from 0 to 99.

More specifically, each time data is transferred from temporary memory to the main memory, $\overline{ENTR^*}$, which is applied to counter and decoder 346, falls to 0. Counter and decoder circuits 346 and 366 count the number of times $\overline{ENTR^*}$ falls to 0 and generate a code corresponding to that number which drives seven segment light emitting diode displays 334 and 335 in the same manner as the data display circuits. The counters in circuits 346 and 366 are reset whenever NAND gate 309 detects either a RST pulse or activation of the L pushbutton, signifying that a new header is to begin. Thus, the number of lines in a given header can be displayed. $L_1$, the header symbol, is placed in memory as 0011. The A and B outputs of temporary memory are applied directly to NOR gate 360 while the C and D outputs are applied through inverters 358 and 359. Thus, when the output of the temporary memory is 0011, all of the inputs to NOR gate 360 are 0 thereby producing a 1 from the output of NOR gate 360 which drives transistors 361, 362 and 363 to apply power to the proper segments of the appropriate seven segment light emitting diode to display the letter L. NOR gate 320 is also 0. The output of NOR gate 320 will be 0 whenever either ENTRHOLD, DATASTROK or DATADISP is 1. DATADISP will be 1 when both inputs to NOR gate 324 are 0 which will occur when flip-flop 322 is set and the IND pushbutton is not depressed (i.e., the output of inverter 321 is 0). Pressing the IND pushbutton will cause flip-flop 322 to toggle alternately, producing a 1 at the output of either NOR gate 323 or 324. When LINE DISP is 1, the inputs to NOR gate 320 normally are 0 and decoder 310 thus is disabled.

Decoder 310 is also disabled whenever $\overline{EMPTY^*}$ is 0 thereby producing a 1 at the output of inverter 318. As explained below, $\overline{EMPTY^*}$ will be 0 whenever a memory position appears at the output of temporary memory into which data has not been entered. Thus, display portions that correspond to locations in temporary memory not containing data will be blank.

Flip-flop 322 can also be set by pressing a "data" pushbutton, thereby generating a DATASTROK pulse at the set input to flip-flop 322.

When Line DISP is 1 NAND gates 344 and 364 are enabled for selection by the HP9 and HP10 outputs of decoder 374 so that when the display position 335 is activated (i.e. HP10 = 1) decoder 346 will be enabled through inverter 345 and when display 334 is activated (i.e. HP9 = 1), decoder 366 will be enabled through inverter 365.

Whenever battery voltage is above the Zener voltage of Zener diode 301 the output of inverter 306 is 1 and the output of inverter 305 is 0. When battery voltage drops, the voltage at the junction of resistors 300 and 302 will also drop until the transition voltage of inverter 305 is reached, the BATT LO output of inverter 305 rising to 1 and being enhanced by the feedback loop of inverter 306 and resistor 304.

When either the BATT LO line, the OVRFLW line of the FULL WARN line rises to 1, the output of NOR gate 307 falls to 0 and through inverter 308 produces dP. A 1 on the dP line will turn on emitter follower transistor 325 thereby placing a positive voltage at the P, or decimal point, inputs to all 18 of the seven segment light emitting diodes. Therefore, 18 decimal points are displayed to indicate a temporary memory overflow, a battery low condition, or a condition where the main memory is near overflow.

Figure 3A:
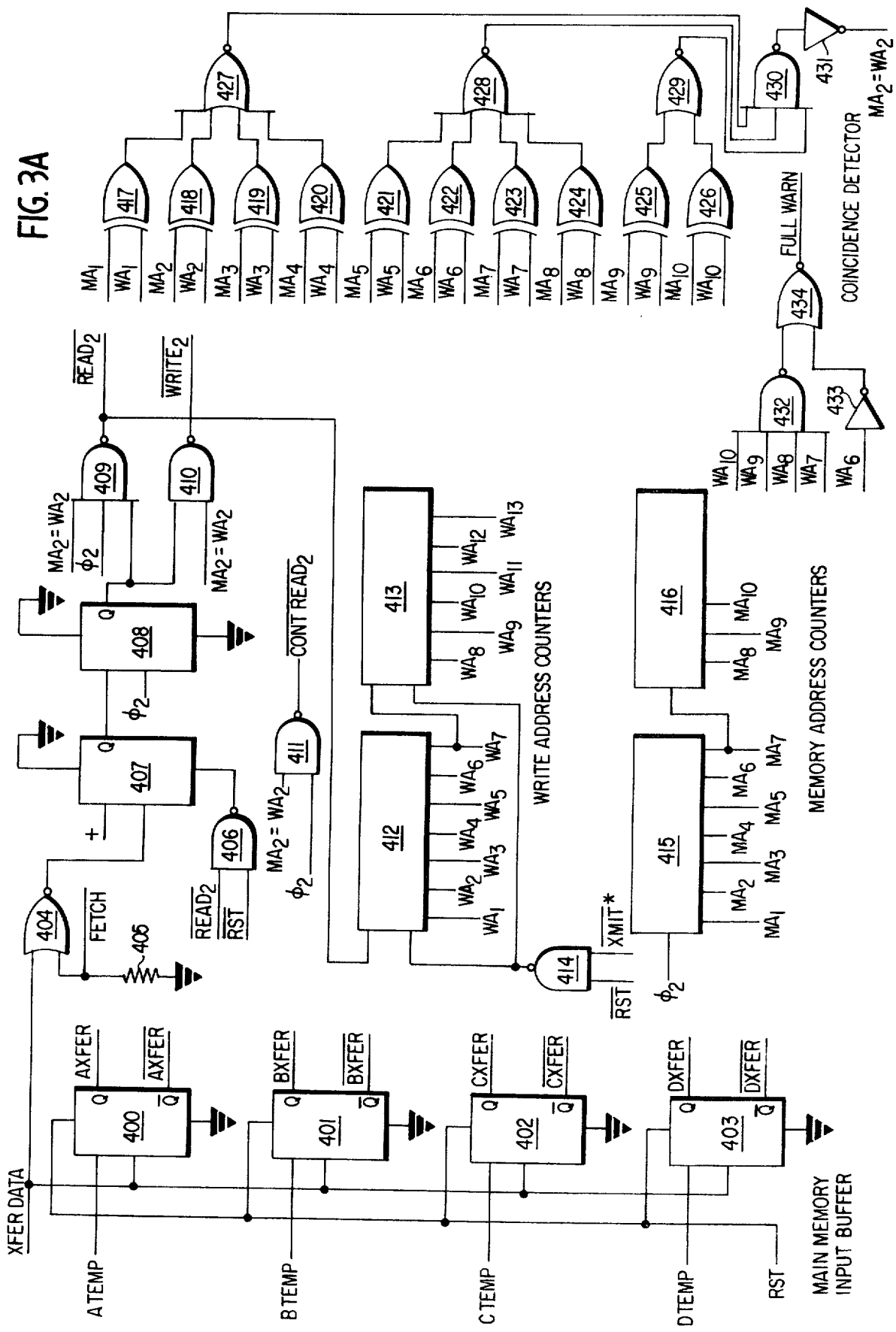
FIG. 3a illustrates components of the main mmemory including input buffer stages, address counters, and logic control circuits including coincidence detection and full capacity warning circuits.
Figure 3B:
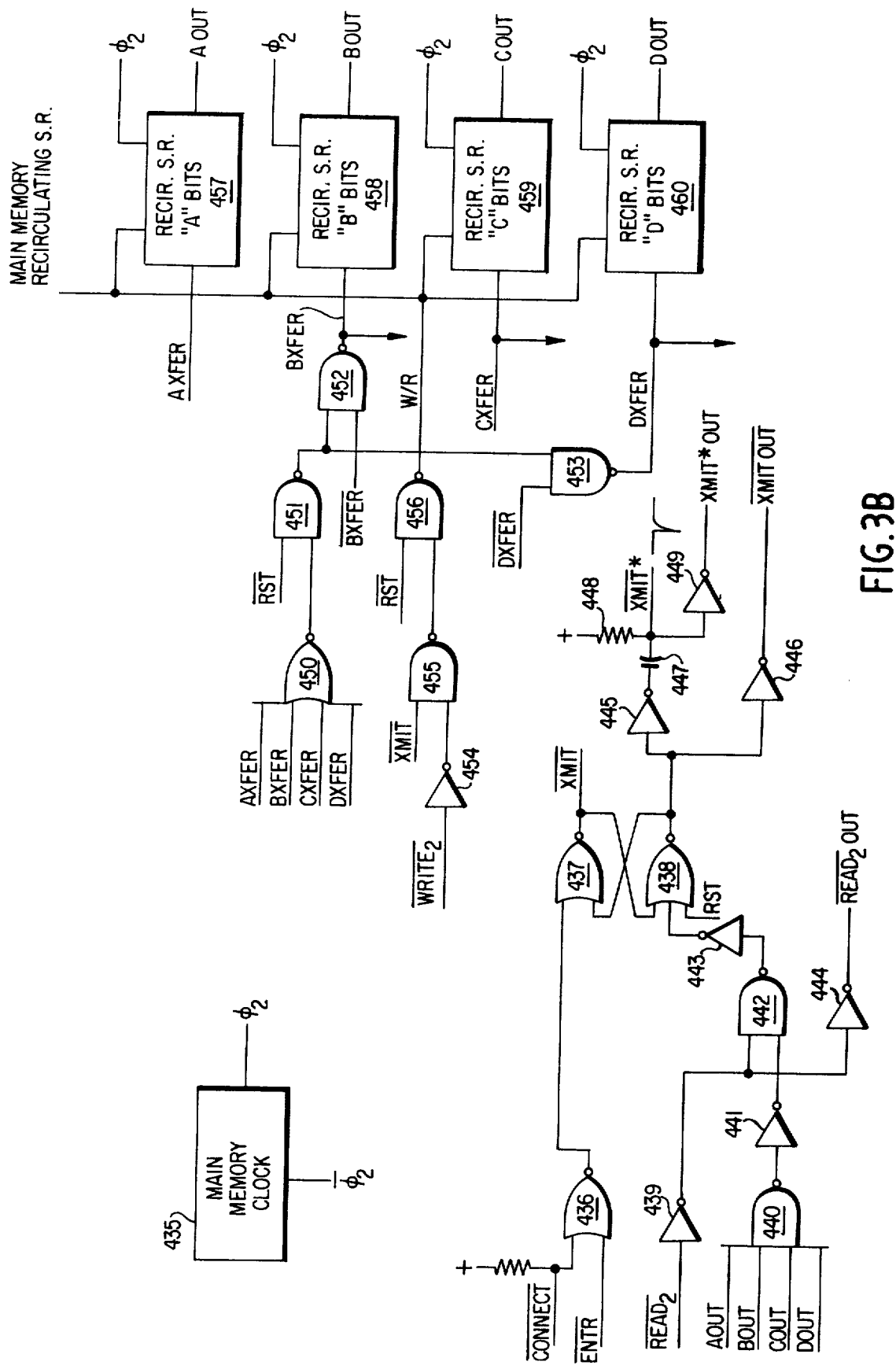
FIG. 3b illustrates in block diagram form the recirculating shift registers constituting the main memory storage and logic circuitry for controlling the entry and recirculation of data therein.
Figure 3C:
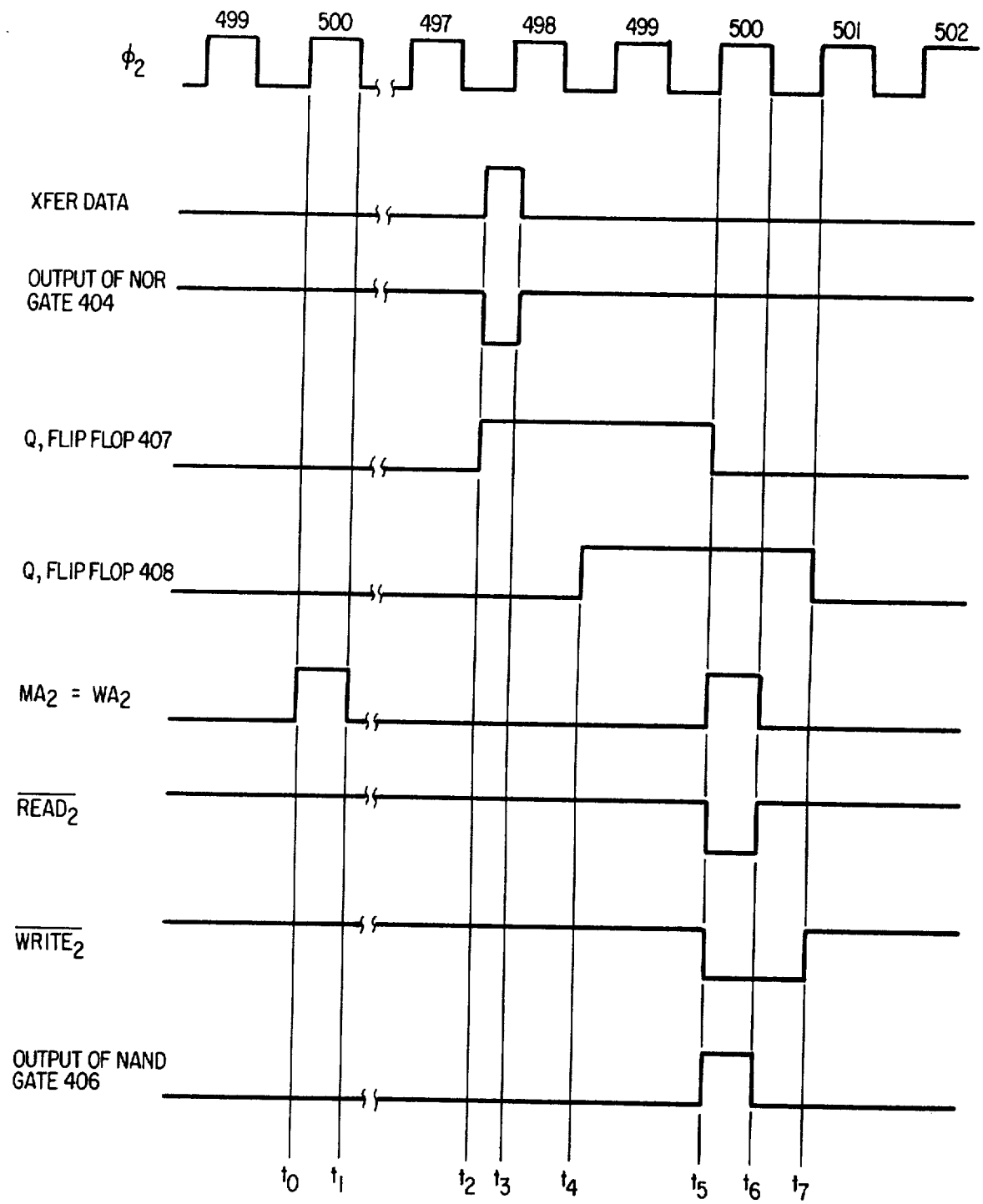
FIG. 3c is a plot of various waveforms illustrating clocking and logic gating functions of the main memory portion.

Circuits and waveforms associated with the main memory are found in FIGS. 3A, 3B, and 3C.

When data is read out of the temporary memory it is first stored in the main memory input buffer consisting of flip-flops 400, 401, 402, and 403. On the leading edge of the XFER DATA pulse the output of the temporary memory (ATEMP, BTEMP, CTEMP, DTEMP) is clocked to the outputs of the aforementioned flip-flops. The XFER DATA pulse is also used to initiate a $\overline{WRITE_2}$ pulse for the purpose of putting the contents of the buffer into the main memory.

A $\overline{WRITE_2}$ pulse will be produced whenever the memory address is equal to the write address ($MA_2 = WA_2$) and the Q output of flip-flop 408 is 1. A $\overline{READ_2}$ pulse will also be produced at that time, but will only be half as wide as the $\overline{WRITE_2}$ pulse. For purposes of illustration, let it be assumed that the write address counter is set at 500. It is also presumed that flip-flop 407 has previously been reset and the Q output is therefore 0. This 0 is clocked through flip-flop 408, thereby preventing the $MA_2 = WA_2$ pulse at the input of NAND gate 410 from appearing on the output of NAND gate 410 as a $\overline{WRITE_2}$ pulse. When a XFER DATA pulse occurs it is inverted by NOR gate 404, FETCH normally being held at 0 by resistor 405 at this time. The 0 to 1 transition, or leading edge of the XFER DATA pulse, clocks the 1 at the input of flip-flop 407 to its Q output. On the 1 to 0 transition following the next 0 to 1 transition of $\bar{\phi}_2$, the Q output of flip-flop 408 rises from 0 to 1, thereby allowing the output of NAND gate 410 to fall to 0 when the memory address equals 500, ($MA_2 = WA_2$) and also to allow the output of NAND gate 409 to fall to 0 when the memory address equals 500 and $\bar{\phantom{a}}_2$ is at 1. The $\overline{READ_2}$ pulse produced at the output of NAND gate 409 is applied to the input of NAND gate 406. Since both $\overline{READ_2}$ and $\overline{RST}$ are normally 1 the output of NAND gate 406 is normally 0 allowing the Q output of flip-flop 407 to be 1 when a XFER DATA pulse occurs. However, when the $\overline{READ_2}$ line falls to 0 the output of NAND gate 406 rises to 1 resetting flip-flop 407 and placing a 0 on its Q output. On the 0 to 1 transition following the next 1 to 0 transition of $\bar{\phi}_2$ the 0 on the Q output of flip-flop 407 is clocked to the Q output of flip-flop 408 preventing the occurrence of furture $\overline{READ_2}$ or $\overline{WRITE_2}$ pulses when the memory address once again equals the write address.

Memory address counters 415 and 416 (FIG. 3A) are incremented by each $\phi_2$ pulse and thus are in phase with recirculating shift registers 457, 458, 459 and 460 (FIG. 3B) which comprise the main memory of the device. The BCD outputs $MA_1$ through $MA_{10}$ are therefore an indication of the status of main memory. Counters 412 and 413 comprise the write address counter which is incremented by each $READ_2$ pulse and it therefore designates the amount of data that has been entered into the main memory. The outputs of exclusive OR gates 417 through 426 are connected to the inputs of NOR gates 427, 428 and 429 whose outputs are presented to the input of NAND gate 430. This circuit is similar to the coincidence detector in the temporary memory and serves the same purpose here - indicate when the memory address coincides with address. At that point the output of inverter 431 ($MA_2 = WA_2$) will rise from 0 to 1 to allow $\overline{WRI-}$ and $\overline{READ_2}$ pulses to occur.

The only constraint imposed upon the design of main memory clock 435 is its frequency. Since data is read out of the temporary memory at the transfer clock frequency (XFER CLK), and the main memory must through 1024 positions every time data is to be transferred, the frequency of the main memory clock must be at least 1024 times higher than the frequency of the transfer clock 215.

When $\overline{WRITE_2}$ falls to 0 the output of inverter 454 rises to 1. Since XMIT is 1 during transfer of data from temporary memory to main memory, a 0 will appear on the output of NAND gate 455 which, since $\overline{RST}$ will be 1, places a 1 on the output of NAND gate 456. This opens the recirculation path and allows AXFER, BXFER, CXFER, and DXFER to be read into memory. If all of these outputs are 0, the inputs to NOR gate 450 are all 0 thereby placing a 1 on the output of NOR gate 450 and causing the output of NAND gate 451 to fall to 0 ($\overline{RST}$ being 1), thereby placing a 1 on the B and D inputs to the main memory through NAND gates 452 and 453. IF AXFER, BXFER, CXFER and DXFER are not all 0 the output of NAND gate 451 is 1 and NAND gates 452 and 453 act as inverters thereby placing BXFER on the B input and DXFER on the D input. It can be seen, then, that every number except 0 is stored in memory in its traditional BCD form, while 0 is stored as a 10 (0101). When $\overline{RST}$ goes to 0 the Q outputs of input buffer flip-flops 400 through 403 (FIG. 3a) are set to 1 and, by virtue of the 1 on the output of NAND gate 456 (FIG. 3b) all 1's are read into memory.

When the data gathering device is connected to the formatter $\overline{CONNECT}$ is 0. When ENTR is pressed the output of NOR gate 436 rises to 1 thereby setting the flip-flop formed by NOR gates 437 and 438, thereby making $\overline{XMIT}$ 0. This causes the output of NAND gate 455 to remain at 1 upon the occurrence of furture $\overline{WRITE_2}$ pulses, thus placing a 0 at the output of NAND gate 456. Therefore, the contents of the input buffer are prevented from being read into memory. The flip-flop formed by NOR gates 437 and 438 is reset whenever a $\overline{READ_2}$ pulse occurs and the output of the main memory is 1111, or whenever RST rises to 1.

In operation, the data gathering device is initially reset after power-up by pressing the CLR pushbutton. As mentioned earlier, this produces a RST pulse from the output of inverter 170 (FIG. 1D). The RST pulse fills the entire main memory with 1's by placing 1's at the output of the main memory input buffer and enabling the inputs to shift registers 457 through 460 by placing a 1 at the output of NAND gate 456. The flip-flop formed by NOR gates 437 and 438, as well as the write address counter and flip-flop 407, are also reset at this time.

Data is then entered into temporary memory and its correctness verified by viewing the data on the light emitting diode display. When the entered data is to be transferred to the main memory, the ENTR pushbutton is pressed and successive characters are presented to the main memory input buffer into which the character is read by the XFER DATA pulse. The XFER DATA pulse also initiates a $READ_2$ pulse which occurs when the write address equals the read address and is used to read the contents of the input buffer into memory and to increment the write address counter. The above procedure occurs until either the main memory is full or it is otherwise desired to transfer the data to the formatter.

The data gathering device then is connected to the formatter and ENTR is pressed once again. This causes the $\overline{XMIT}$ line to fall to 0 where it remains until the end of the transfer operation. The 0 $\overline{XMIT}$ causes the write address counter to be reset to 0, resets the initial reset circuits found in FIG. 1D so that a later RST pulse may be produced, prevents further entry of data into the main memory by placing a 1 on the output of NAND gate 455, and enables certain circuits in the formatter. Thereafter, data is read out of main memory in response to each positive going FETCH pulse at the input to NOR gate 404. Each FETCH pulse produces one $\overline{READ_2}$ and $\overline{WRITE_2}$ pulse at the appropriate time which increments the write address counter. When all of the data has been read from the main memory, the next character will be a 1111 that was placed in memory during initial reset. At this point NAND gate 440 falls to 0 allowing the next $\overline{READ_2}$ pulse to reset the flip-flop formed by NOR gates 437 and 438 thereby returning $\overline{XMIT}$ to 1. Before data gathering can begin the CLR pushbutton is once again pressed, thereby producing another RST pulse to "unlock" the keyboard 100.

Whenever 992 characters have been entered into the main memory the output of NAND gate 432 and inverter 433 will fall to 0 producing a FULL WARN signal at the output of NOR gate 434 which will cause 18 decimals to be displayed to indicate that the 1,024 character capacity is almost full.

When the data is to be read from the portable device, it is mounted on the interface/formatter and by a suitable initiation control, or automatically, $\overline{CONNECT}$ is 0. $\overline{ENTR}$, when 0 upon depressing the ENTR button, causes $\overline{XMIT}$, through NOR 436 and flip-flop 437, 438, to go to 0. As long as data is in main memory, AOUT ... DOUT are not all 1 and thus NAND 440 outputs a 1. Through inverter 441, and with the first $\overline{READ_2}$ at 0 (from FIG. 3A), through inverter 439, NAND 442 outputs 0 and through inverter 443 outputs a 1 to flip-flop 437, 438 to maintain it reset and thus to maintain $\overline{XMIT}$ at 0. The production of the remaining outputs XMIT*OUT, $\overline{XMIT\ OUT}$ and $\overline{READ_2}_{OUT}$ are apparent.

A $\overline{CONT\ READ_2}$ signal is sent to the interface-formatter whenever $MA_2 = WA_2$ and $\phi_2$ is detected by NAND gate 411.

$\overline{XMIT\ OUT}$ is connected to the reset input of flip-flops 504 and 505 through inverter 505 as XMITTING. Therefore, when $\overline{XMIT\ OUT}$ falls to 0, the reset inputs to flip-flops 504 and 505 are 1 (assuming either DETECT L or >LINE is 0 and thus $\overline{LOAD\ END}$ at output of NAND 508 is 1) thereby allowing the XMIT*OUT pulse, after passing through inverter 502 and NAND gate 503, to clock a 1 to the output of flip-flop 504. The next succeeding XMIT CLOCK pulse from XMIT CLOCK 538 will then clock the 1 at the output of flip-flop 504 to the output of flip-flop 505, thereby enabling the XMIT CLOCK pulse to pass through NAND gate 506 and inverter 507 to counter 510. Counter 510 will then repetitively cycle through each of 12 stages in synchronism with XMIT CLOCK 538, each cycle corresponding to a character, and each stage corresponding to a bit time in the output data stream.

The above sequence can also be initiated by activating RESTART SW 500 if XMITTING is 1.

Counter 510 will continue to recycle until NAND gate 506 is disabled by reset of flip-flop 505. Flip-flop 505 can be reset either by sensing DETECT L and >LINE by NAND gate 508 when a new header is to begin or by $\overline{XMIT\ OUT}$ being 1, thereby producing a 0 at the output of inverter 515, (i.e., XMITTING = 0) when all of the data contained in the dataholder has been read out.

Counter 510 produces a four bit BCD output (a, b, c, d) that is inverted by inverters 511 through 514. The count is then decoded by NAND gates 526 through 536 to produce, in sequence, $\overline{STPI}$, $\overline{FETCH?}$ $\overline{B1 - B7}$, $\overline{PAR}$ and $\overline{INCREM}$. There is also a one bit space between $\overline{FETCH?}$ and $\overline{B1}$ which is not decoded.

Figure 4A:
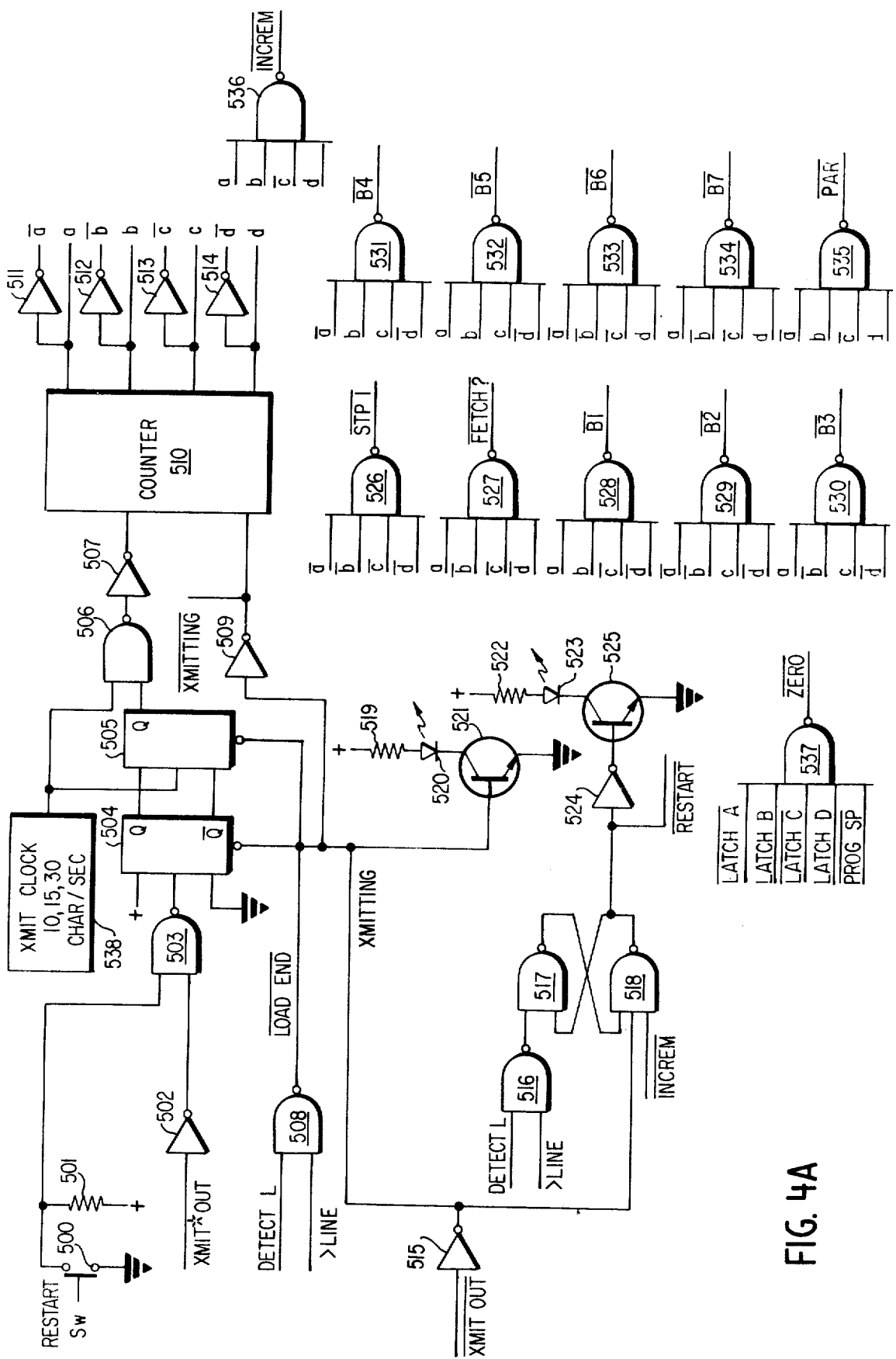
FIGS. 4a and 4b are block diagrams of various logic and control circuitry for readout of data from the main memory of the portable device and transmission thereof to a further utilization device.
Figure 4B:
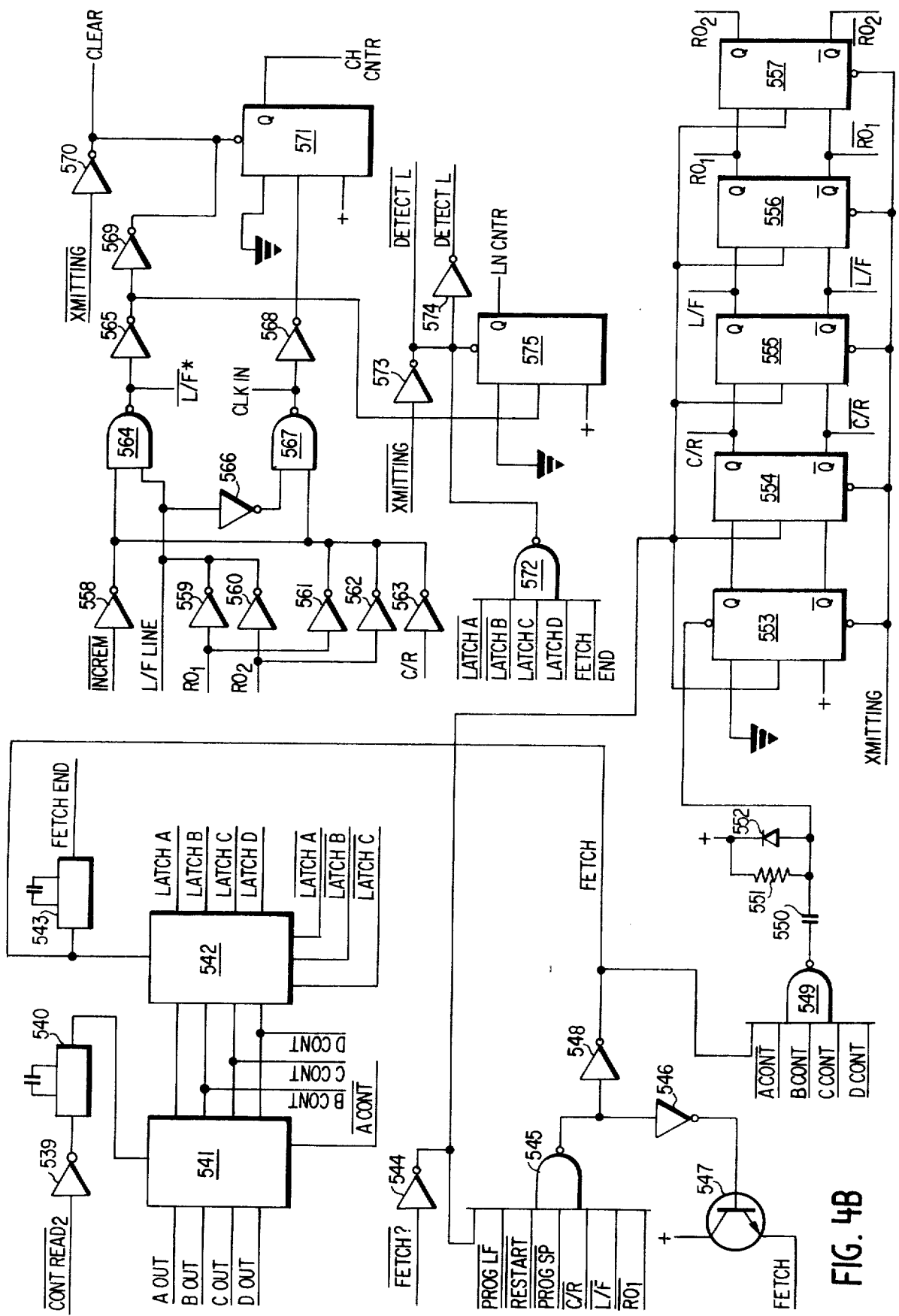

Referring to FIG. 4B, the recirculating data in main memory (AOUT, BOUT, COUT, and DOUT) is continuously available to bistable latch 541. As mentioned earlier, when the appropriate memory position is present at the input to bistable latch 541, $\overline{CONT\ READ}$ after passing through inverter 530 will trigger one shot 540 to transfer data to the output of bistable latch 541. Thereafter, the trailing edge of the next FETCH pulse will trigger one shot 543 to transfer the data at the output of bistable latch 541 (A CONT, B CONT, C CONT, D CONT, $\overline{ACONT}$) to the output of bistable latch 542 to produce corresponding outputs LATCH A, LATCH B, LATCH C, and LATCH D as well as their inverse $\overline{LATCH\ A}$, $\overline{LATCH\ B}$, $\overline{LATCH\ C}$ and $\overline{LATCH\ D}$.

FETCH will occur on the second stage of each cycle if all of the inputs to NAND gate 545 (i.e., $\overline{FETCH?}$ inverted by inverter 544, PROG LF, RESTART, PROG SP, C/R, L/F and $RO_1$) are 1. This is to insure that data will now be transferred from the data holder to the formatter while special characters are being transmitted from the formatter. The output of NAND gate 545 is then inverted by inverter 546 and applied to the dataholder through emitter follower transistor 547. It is also inverted by inverter 548 and used as a trigger for one shot 543 and as an input to NAND gate 549.

The end of record sequence (C/R, L/F, $RO_1$, $RO_2$) occurs during XMITTING whenever FETCH and the "empty" code which follows each line (0111) is detected by NAND gate 549. The 1 to 0 transition at the output of NAND gate 549 is differentiated by capacitor 550 and resistor 551 to produce a negative going pulse that sets flip-flop 553. Diode 552 is provided to prevent the voltage at the set terminal of flip-flop 553 from rising to a damaging level upon the 0 to 1 transition of the output of NAND gate 549. Upon the next FETCH? stage the 1 at the output of flip-flop 553 will be shifted to the output of flip-flop 554, and a 0 will be clocked to the output of flip-flop 553. Thereafter, the 1 will be shifted one flip-flop upon each succeeding FETCH? stage producing in sequence C/R, L/F, $RO_1$, and $RO_2$.

As mentioned previously, zero is stored in memory as 0101. NAND gate 537 (FIG. 4A) detects this code, and if $\overline{PROG\ SP}$, produces $\overline{ZERO}$.

Indicators are also provided to display the status of the interfaceformatter. Whenever XMIT OUT is 0, transistor 521 is turned on causing current to flow through resistor 519 and light emitting diode 520 to indicate that data is being transferred from the dataholder to the formatter.

Whenever DETECT L and >LINE is sensed by NAND gate 516 the output of the flip-flop formed by NAND gates 517 and 518 will be 0. The 0 output will be inverted by inverter 524 to turn on transistor 525. Current will then flow through resistor 522 and light emitting diode 523. As mentioned earlier, DETECT L and >LINE, as detected by NAND gate 508, also disables NAND gate 506 to prevent XMIT CLOCK pulses from actuating counter 510. NAND gate 506 can be re-enabled by activating RESTART SW 500. Thus, the indication provided by light emitting diode 523 notifies the operator that RESTART SW 500 should be activated to resume transmission. Diode 523 will remain illuminated until either $\overline{XMIT\ OUT}$ rises to 1 or until counter 510 resumes its count after activation of RESTART SW 500 to produce INCREM which will cause the output of the flip-flop formed by NAND gates 517 and 518 to rise to 1.

Flip-flop 571 (FIG. 4B) is set either at the end of the transmission when $\overline{XMITTING}$ rises to 1 and is inverted by inverter 570, or when the output of NAND gate 564 is 0 and is inverted by inverters 565 and 569. The output of NAND gate 564 will be 1 whenever $\overline{INCREM}$ is 0, L/F LINE is 1 and the outputs of none of the inverters 559 through 563 are 0 (i.e., RO₁,RO₂ and C/R are all 0). The Q output of flip-flop 571 will initially be 1 since just prior to transmitting, XMITTING will be 1. Normally, one INCREM pulse will be produced during the time that a L/F line signal is present. Thus, one L/F* pulse will be produced for every L/F LINE pulse. In addition to setting flip-flop 571, this signal will also make CLEAR 0 in order to reset the character counter.

A 0 will be clocked to the output of flip-flop 571 if either of the inputs to NAND gate 567 fall to 0, thereby producing a 1 at its output which is inverted by inverter 568 to give a 1 to 0 transition at the clock input of flip-flop 571. This transition will occur on the trailing edge of INCREM if L/F LINE is 0 and none of the special characters is present.

In summary, one CLK IN pulse will be produced every INCREM pulse (i.e., each time a character is transmitted) and one L/F* pulse will be generated for every L/F LINE pulse (i.e., each time a line feed is transmitted). The Q output of flip-flop 571 will normally be 0, but will be 1 for the period that a line feed is being transmitted by the interface formatter.

If either RO₁, RO₂ or C/R is 1, NAND gates 564 and 567 will be disabled to inhibit the production of either L/F* or CLK IN pulses. Thus, the end of record characters are not counted by the character counter.

The Q output of flip-flop 575 will be set to 1 by FETCHEND whenever the header code ( 0011 ) is detected by NAND gate 572. A DETECT L signal is also produced at the output of inverter 574. Just prior to transmission XMITTING is 1 which, when inverted by inverter 573, places a 0 on the set input of flip-flop 575 to make its Q output initially 1. Whenever a L/F* signal is produced at the output of NAND gate 564 the 0 at the input to flip-flop 575 will be clocked to the Q output. Thus, the Q output of flip-flop 575 will normally be 0, but will be 1 during the time that a header code is present.

Figure 4C:
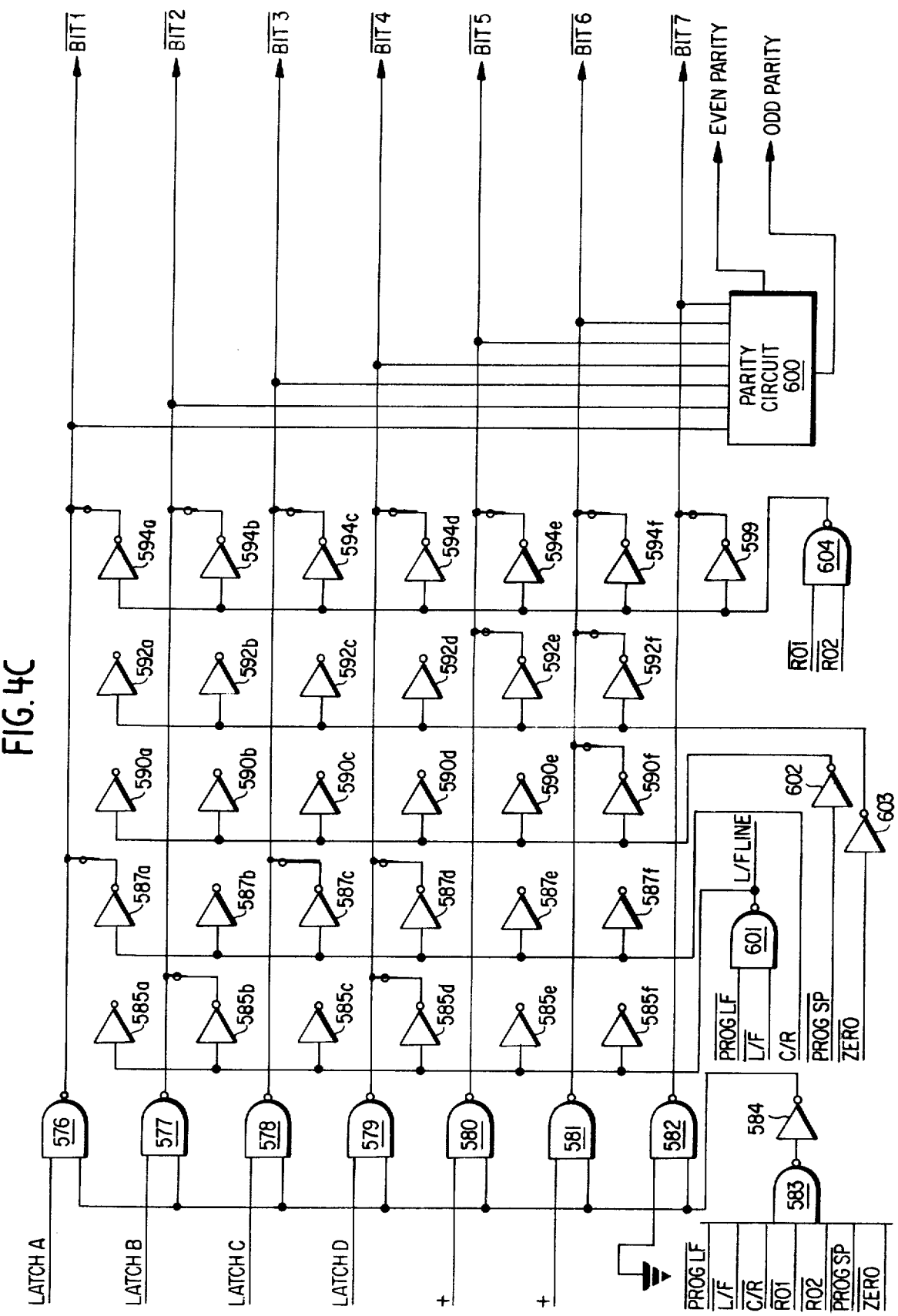
FIGS. 4c and 4d are block diagrams of the interface circuits employed for translating the formatter output into a form suitable for transmission and particularly illustrate parallel to serial conversion of the data such as for supply to a teletype driver circuit.
Figure 4D:
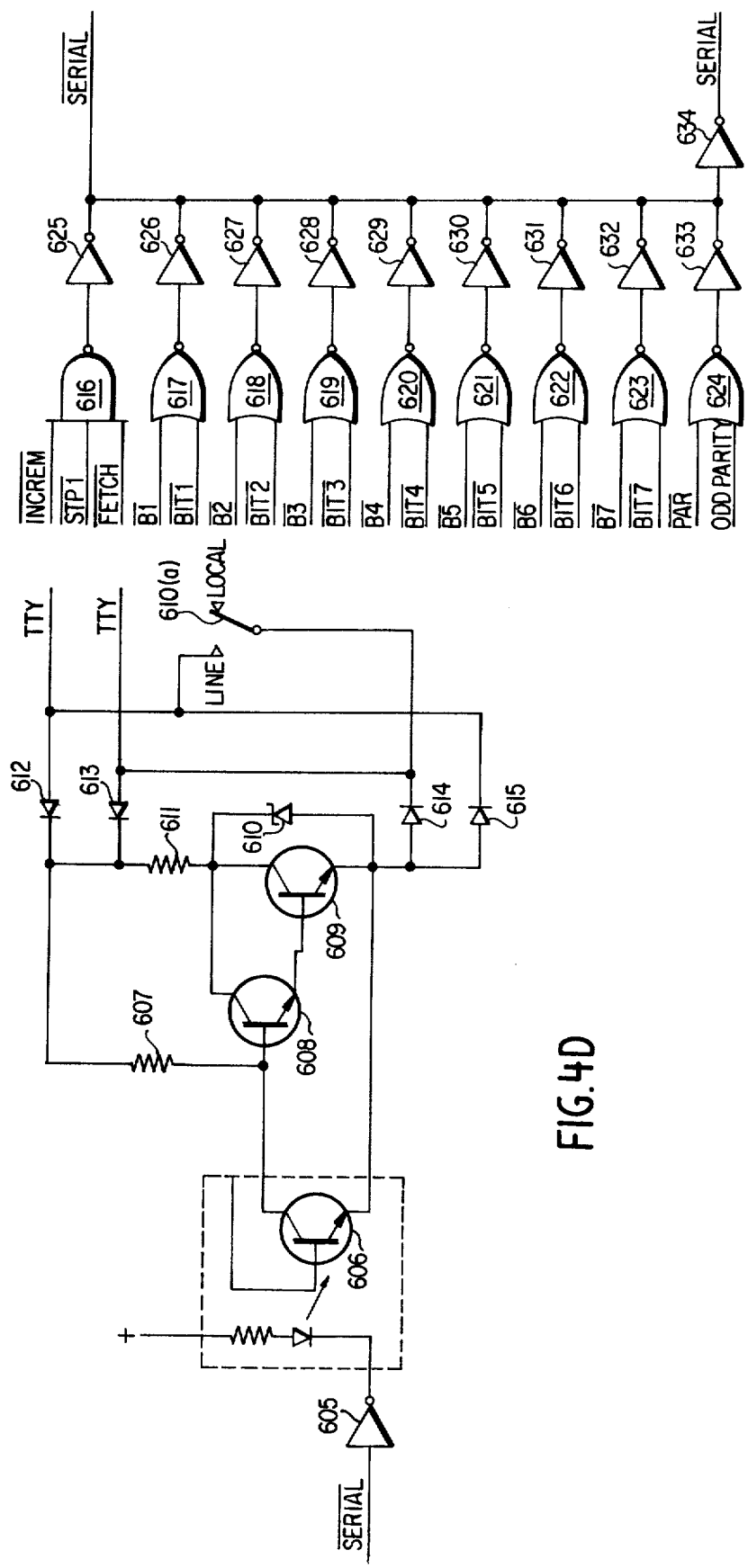

The interface circuits are found in FIGS. 4C and 4D. They are used to translate the formatter output into a form suitable for transmission by wire, and essentially consist of a parallel to serial converter and a teletype driver circuit.

Numerical data in parallel BCD form is presented to NAND gates 576, 577, 578 and 579. If none of the several special characters is present the output of NAND gate 583 will be 0 which, when inverted by inverter 584, places a 1 at the input to NAND gates 576 through 582, thereby causing NAND gates 576 through 582 to act as inverters. Therefore, BIT 1, BIT 2, BIT 3, and BIT 4 will simply be the inverse of the numerical data in parallel BCD form while BIT 5 and BIT 6 will be 0 and BIT 7 1. Inverters 585 through 599 will not alter the output unless their output is 0 and the output of NAND gates 576 through 582 would otherwise be 1.

When any of the special characters is present the output of NAND gate 583 rises to 1 placing a 1 at the output of NAND gates 576 through 582. However, certain outputs, depending on which special character is present, will be held at 0 by one or more of inverters 585 through 599. The particular code for a given special character may be selected by simply wire wrapping the signal line for each special character to the proper output line. Thus, the interface formatter can be made compatible with any of the standard teletype or computer formats such as ASC II or EBDIC. Using the configuration shown, for example, if L/F is present, L/F will be 0 making the output of NAND gate 583 1, thus placing 0's at the input of NAND gates 576 through 582. The output of NAND gate 601 will be 1 placing 0's at the output of inverters 585a through 585f. The parallel BCD output will therefore be 1010111.

The outputs are also fed to parity circuit 600 to ascertain whether the parity is odd or even.

Referring to FIG. 4D, the parallel BCD output is then translated into serial form with 12 bits in each serial word. The switching inputs are normally 1. They fall to 0 for one bit rate clock pulse in the following order: STP1, FETCH, B1, B2, B3, B4, B5, B6, B7, PAR and INCREM. Therefore, the output of NAND gate 616 will be 0 except for the first, second and twelveth bits. The output of NOR gates 617 through 624 will normally be 0 except that each in turn will be equal to bits 1 through 7 and the inverse of ODD PARITY. The serial output will then be 1, 1, 0 (Space) BIT 1, BIT 2, BIT 3, BIT 4, BIT 5, BIT 6, BIT 7, ODD PARITY, and 1.

The SERIAL line found at the output of inverters 624 through 633 drives a teletype driver circuit comprising elements 605 through 615.

Element 606 consists of a light emitting diode optically coupled to a phototransistor. When current flows through the diode, the phototransistor will also conduct current if properly biased. Therefore, when SERIAL is 0 the input to element 606, as inverted by inverter 605, will be 1. Thus, no current will flow through the diode, and when it is 1 current will flow through the diode and saturate the phototransistor. The current flowing through resistor 611 will flow through Darlington configured transistors 608 and 609 when SERIAL is 0 and a lesser amount of current will flow through resistor 611 and Zener diode 610 when SERIAL is 1 since transistors 608 and 609 will be at cut-off. Diodes 612, 613, 614, and 615 are provided to allow either TTY terminals to be biased with a positive voltage. Zener diode 610 is provided to maintain the output voltage constant when transistors 608 and 609 are in their off condition.

Figure 4E:
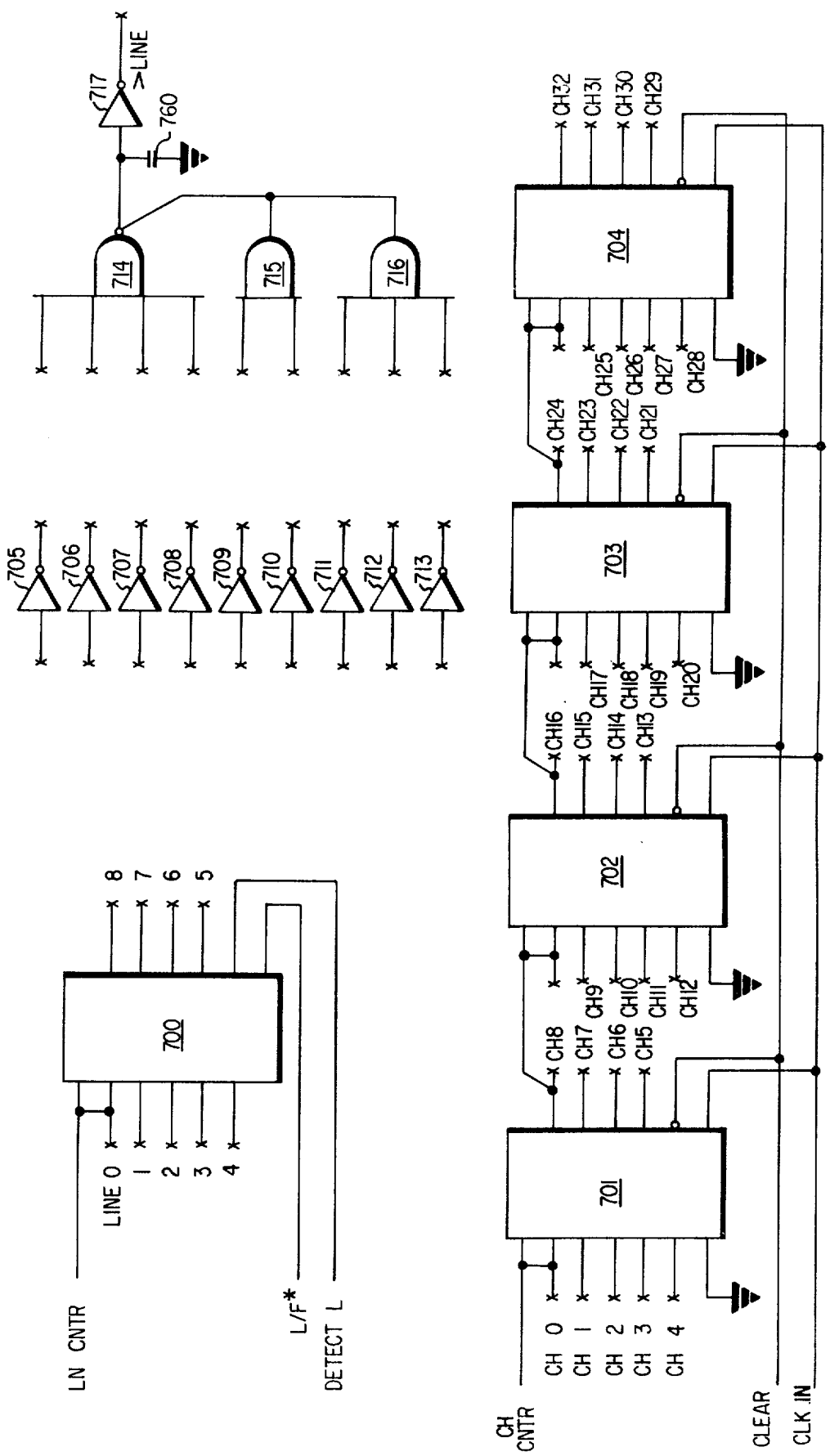
FIGS. 4e and 4f are block diagrams of the programmer circuits employed for interjecting line feeds and spaces within the data stream.
Figure 4F:
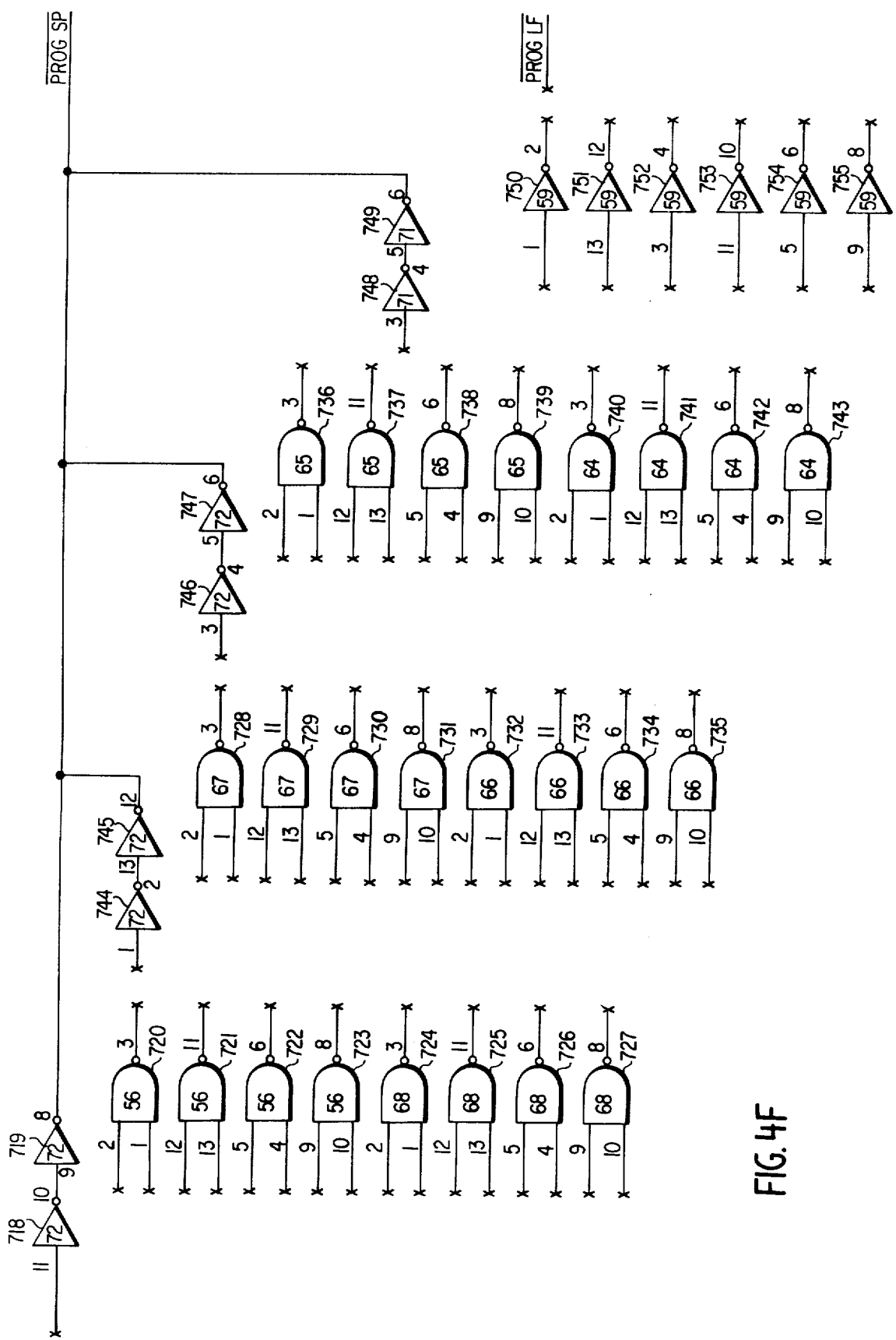

The circuits used for programming line feeds and spaces within the data stream as well as for generating a >LINE signal when a predetermined number of lines have been counted are found in FIGS. 4E and 4F.

As mentioned earlier, a 1 is placed on the CHO input of shift register 701 at the start of each transmission and upon the occurrence of each L/F LINE pulse. However, CH CNTR returns to 0 at the start of the first CLK IN pulse. Thereafter, the 1 placed in the first stage of shift register 701 is shifted one stage for each CLK IN pulse. Since one CLK IN pulse occurs for each character transmitted, the position of the 1 is an indication of the number of characters that have been transmitted. The character counters 701 through 704 are reset to zero when CLEAR becomes 0 which occurs at the end of a transmission or whenever a line feed is transmitted. Thus, the character counter counts the number of characters in a given line.

Similarly, a 1 is placed at the LINE 0 input to shift register 700 at the start of transmission and at the beginning of each header. However, LNCNTR returns to 0 at the start of the first L/F* pulse. Thereafter, the 1 is shifted one stage for each L/F* pulse. Since one L/F* pulse occurs for each line feed, the position of the 1 is an indication of the number of lines in a given header. The line counter is reset to zero at the start of each header when DETECT L is 0.

A >LINE signal can be produced after any desired number of lines (less than eight) by simply connecting the appropriate outputs of shift registers 700 through 704 to NAND gates 714 through 716, either directly or through inverters 705 through 713. For example, if it is desired to produce a >LINE signal when seven lines have been counted, the LINE 7 output of shift register 700 would be connected directly to one input of NAND gates 714 through 716 while the other outputs of shift register 700 would be connected to the other inputs of NAND gates 714 through 716 through inverters 705 through 713. When the proper count is reached, the output of NAND gate 714 will fall to 0 quickly discharging capacitor 760 and making >LINE the output of inverter 717, a 1. After line counting is resumed, capacitor 760 will remain discharged long enough for a header code to be detected by NAND gate 572 to produce DETECT L. The fact that DETECT L and >LINE are both 1 will be sensed by NAND gate 508 (FIG. 4A) to halt transmission until manual restart.

Referring to FIG. 4F, the line counter 700 and character counter 701 through 704 can also be used to interject spaces and line feeds in predetermined locations. To accomplish this function, appropriate character counter and line counter outputs are connected by wire wrap to the inputs of NAND gates 720 through 743. The outputs of these NAND gates are connected by wire wrap to either the $\overline{\text{PROG SP}}$ terminals (the input of inverters 744, 746 and 748) or the $\overline{\text{PROG LF}}$ terminal. For example, if a space at line 2 character 10 is desired, one input of NAND gate 720 would be connected to the line 2 output of line counter 700 while the other input of NAND gate 720 would be connected to the CH 10 output of character counter 702. The output of NAND gate 720 would be connected by wire wrap to the input of inverter 744. Thus, when line 2 character 10 is reached, the output of NAND gate will fall to 0 and, after passing through inverters 744 and 745, will appear as a 0 on the $\overline{\text{PROG SP}}$ signal line.

Inverters 750 through 755 provide the capability of programming a wide variety of logic functions.

Figure 5A:
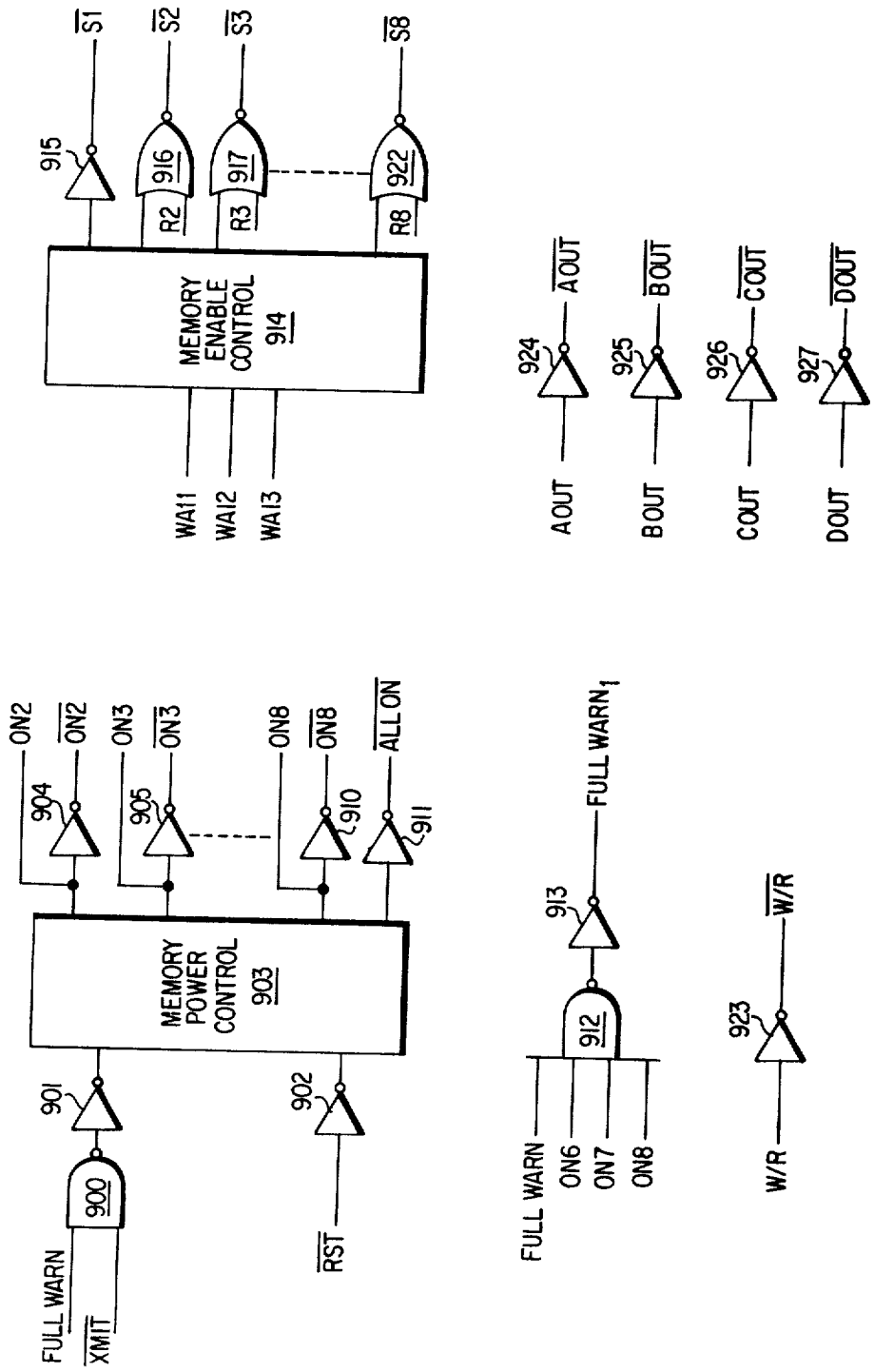

As before noted, increased storage capacity is provided by the invention in a unique manner whereby the energy requirements are minimized, consistent with the intended portability of the dataholder device. A system diagram thereof is shown in FIGS. 5A and 5B, as implemented for seven additional banks (935, 936, 941 in FIG. 9B) each illustratively having the same storage capacity as the one bank (i.e., comprising the 4 recirculating shift registers 457 to 460 for storing 4 bit BCD coded data inputs) of FIGS. 3A and 3B. In the system of FIGS. 5A and 5B, the additional seven individual memory banks are activated in succession, and only as needed to satisfy current storage requirements, as the first memory bank - - namely that of FIGS. 3A and 3B approaches a full condition. The first memory bank (FIG. 3B) is always powered; powering of the seven additional banks requires the power control signal ON2 to ON8 output by control 903, as now described.

In FIG. 5A, the outputs of memory power control 903 were initially reset to 0 by the $\overline{\text{RST}}$ pulse through inverter 902, thereby deactivating memory banks 935 through 941. When 992 characters have been entered into the first main memory bank comprising registers 457 through 460 (FIG. 3B), a FULLWARN condition is detected by NAND gate 432, inverter 433 and NOR gate 434 (FIG. 3A). The FULLWARN signal, and condition $\overline{\text{XMIT}}$ enables NAND gate 900 to act through inverter 901 to increment memory power control 903. When memory power control 903 is first incremented, its ON2 output will rise to 1 causing the output of inverter 904 to fall to 0 and thereby apply power to memory bank 935 through transistor 955. When the memory power control 903 is incremented again (which will occur 32 characters before memory bank 935 has been filled), the ON3 output will rise to 1 causing the output of inverter 905 to fall to 0 and thereby apply power to memory bank 936 through transistor 956. However, the ON2 output remains at 1 and power will continue to be supplied to memory bank 935. This successive activation continues throughout the number desiderata banks until, when the last memory bank 941 has been activated, all of the outputs of memory power control 903 are 1 and the outputs of inverters 904 through 911 are 0. At this time, all memory banks will be powered, as indicated by the $\overline{\text{ALL ON}}$ output.

Memory enable control 914 selects the memory bank in use by sequentially activating one of its eight outputs (i.e., for the illustrative eight bank system). It is noted that in the single memory bank embodiment of FIG. 3B, the memory bank is always powered and, in data input operations, normally is enabled to receive data. In the multiple memory bank embodiment of FIGS. 5A and 5B, appropriate input gating elements are provided to respond to the selection signals S1, S2 . . . now to be described, which seen to select a given bank to receive data, and to disable further data input to a given bank when it is full, and to select the successive bank and direct further data to it, for all of the banks, automatically and in succession. Those gates would correspond basically to the gates 944-947 as shown in memory bank control 928 for the second memory bank.

Initially, therefore, S1 is 1 causing the first memory bank (comprising recirculating registers 457 through 460 - - FIG. 3B) to be enabled. When the first memory bank contains 1,024 characters, memory enable control 914 will increment, causing $\overline{\text{S1}}$, the output of inverter 915, to go to 1 and $\overline{\text{S2}}$, the output of NOR gate 916, to be 0. The next successive memory bank 935 now is enabled, and all incoming data will be stored there. When memory bank 935 contains 1,024 characters, memory enable control 914 increments, $\overline{\text{S2}}$ terminates, and $\overline{\text{S3}}$ is generated for selection and enabling of memory bank 936.

Thus, power is applied to each successive memory bank when the next preceding memory bank contains 992 characters, and the said successive memory bank is enabled for storage when the previous memory bank contains 1,024 characters, i.e., is full. The resulting 32 character storage time period (from 992 to 1,024) assures an adequate initializing interval, e.g., for power-up, stabilize, and clear operations for the memory bank, to prepare it for accepting data. For example, R2 goes to 1 during this interval causing the output of NOR 916, $\overline{\text{S2}}$, to go to 0 which enables memory bank 935 to be cleared.

When all of the memory banks have been activated, ON6, ON7 and ON8 will be 1. As the 992nd character is entered into memory bank 941, this condition will be detected by NAND gate 913 producing a FULLWARN$_1$ signal from the output of inverter 913 to indicate that the capacity of the dataholder has been reached.

Referring to FIG. 5B, when memory bank 935 is activated during the power-up interval, ON2, ON3 and FULLWARN will be 1 causing the output of NAND gate 942 to be 0 thereby disabling NAND gates 943 through 947 and making R2, the output of inverter 948, a 1. As mentioned earlier, the 1 R2 signal enables NOR gate 916 to allow $\overline{S2}$ to enable memory bank 935. Since NAND gates 943 through 947 are now disabled, their respective outputs are 1 causing a true write signal (output of 943) and 1 inputs to the memory (outputs of 944 through 947). This causes all 1's to be written into memory during the power-up interval which is the clear condition. When the power-up interval is completed, the gates 943 through 947 are enabled and $\overline{W/R}$ takes control, writing data only into the selected memory bank 935 (selected by $\overline{S2}$).

Each memory bank, when activated, recirculates in synchronism with the clock, $\bar{\phi}_2$.

It can be seen that the corresponding outputs of memory banks 935 through 941 are tied together. The output of any memory bank that is not enabled normally is 1. However, a 0 at the output of an enabled memory bank causes the output line to be 0, while a 1 at the output of an enabled memory bank allows the output line to remain at 1. Thus, the output lines follow the output line of the enabled memory bank.

Readout of the multiple memory banks, as to each individual bank, proceeds as before described as to the single bank embodiment; moreover, selection and readout of the multiple banks individually and in succession proceeds similarly to the selection and addressing for the data input, or storage function.

Thus, decoder 914 decodes the write address outputs $WA_{11}$, $WA_{12}$, $WA_{13}$ (see FIG. 9A) to 1 of 8 lines, ($\overline{S1}$ to $\overline{S8}$) to cause selection of the appropriate memory bank. When transmission is started, $\overline{XMIT}$ goes low disabling NAND 900, thereby causing the memory power control 903 to remain locked at its last position of advance and thus to continue powering of only those memory banks used for data input. The memory enable control 914 is reset to $\overline{S1}$ because the write address is reset to zero at the start of transmission by $XMIT^*$ (gate 414 of FIG. 3A). The memory enable control 914 then cycles through selection of each memory bank in sequence, in the same manner as described for data input operations.

The FULLWARN condition from FIG. 3A has been employed in that notation in FIGS. 5A and 5B for convenience. As contrasted to the single memory bank embodiment, however, where FULLWARN produces the indicator output of FIG. 2, in FIGS. 5A and 5B, that indication is produced only upon the last of the multiple banks approaching a full condition - - at which time the $FULLWARN_1$ output is produced in FIG. 5A. Thus, in FIG. 2, the ($FULLWARN_1$) notation corresponds to this condition of the multiple memory bank embodiment.

Figure 6A:
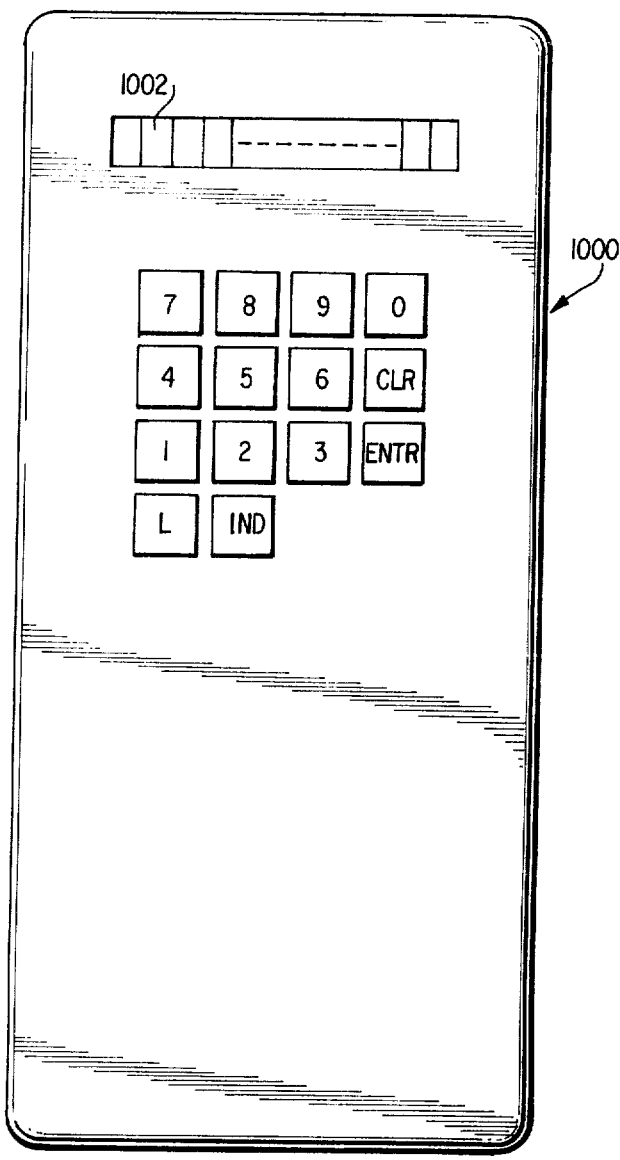
FIGS. 6a and 6b are a top plane view and a side elevational view partially in cross section of the portable hand-held device.

As has been emphasized, the system of the invention includes both a portable dataholder device which is intended for hand-held operation and thus must be lightweight and portable, and operable under extreme environmental conditions. Referring to FIG. 6A, the planar top view of the portable dataholder device illustrates its simple construction, including a basically rectangular housing 1000 having at an upper portion thereof a display area 1002 containing the electro-optical display. Particularly, the preferred embodiment herein disclosed comprises 18 character display positions each implemented by a seven segment front arrangement of light emitting diodes. With joint reference to FIG. 6B, the display area 1002 is seen to permit viewing of a display screen 1004 containing therebehind the light emitting diodes illustratively shown at 1006. It will be appreciated that numerous alternative types of electro-optical display elements may instead be employed and thus the configuration of the elements 1006 does not correspond necessarily to any particular display element type.

Figure 6B:
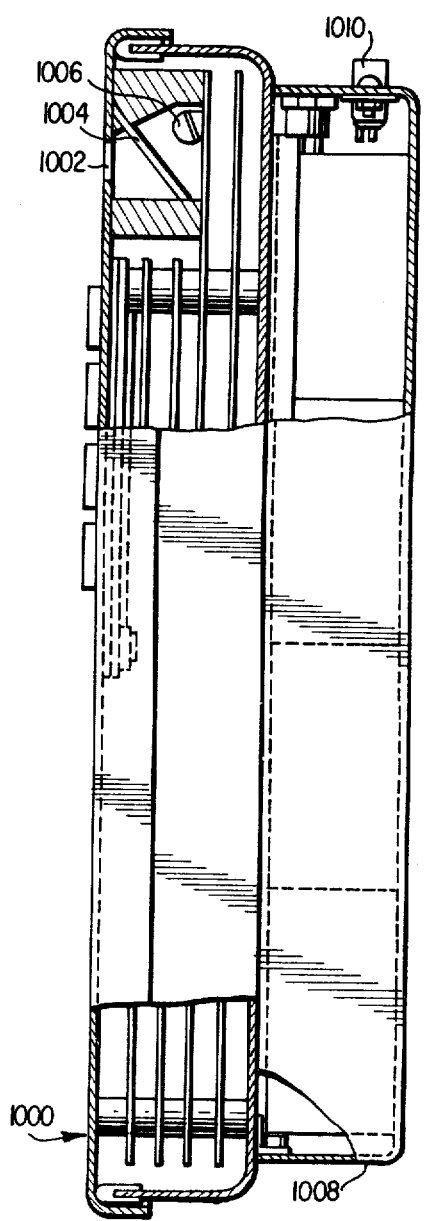

The data input pushbuttons for the numerics 1 through 9 and 0 and the control pushbuttons are shown, as well, in FIG. 6A, and from FIG. 6B are seen to be flush with the upper surface of the housing 1000. The necessary electronics are mounted on suitable circuit boards or other circuits, as suggested in FIG. 6B. A removable battery pack 1008 is carried on the lower or back surface of the portable dataholder. A multiple contact connector 1010 carrying numerous electrical connections to the memory and control circuits of the dataholder is mounted for convenience on the rear of the housing. A protective cap on the connector may be provided or other precautions taken to insure hermetic sealing of the dataholder unit.

Figure 7A:
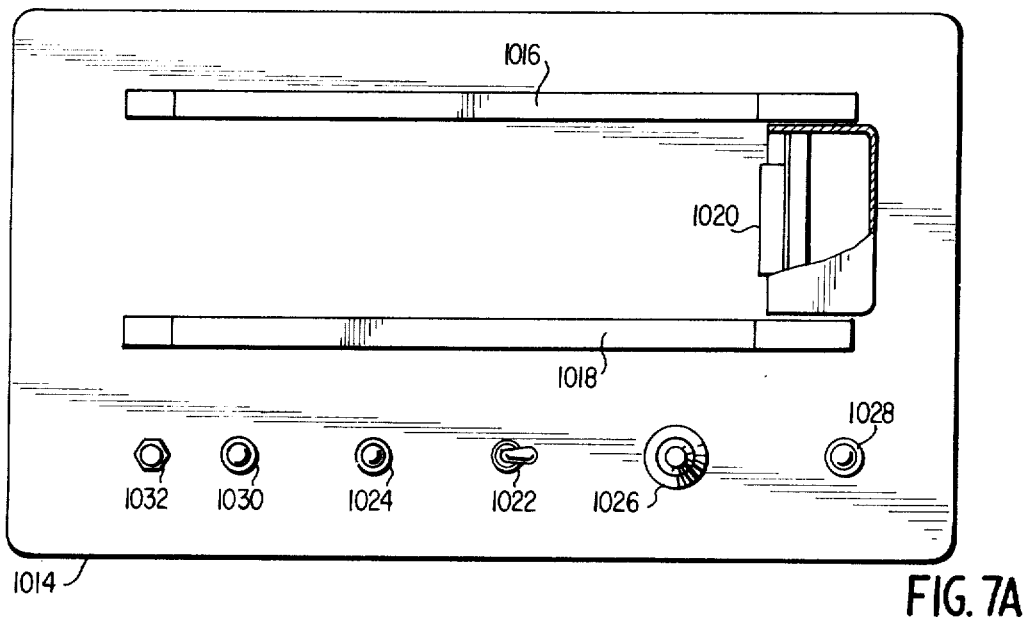
FIG. 7a is a top plane view of a structure located at a central and containing the formatter and interface circuits for receiving the portable dataholder device.
Figure 7B:
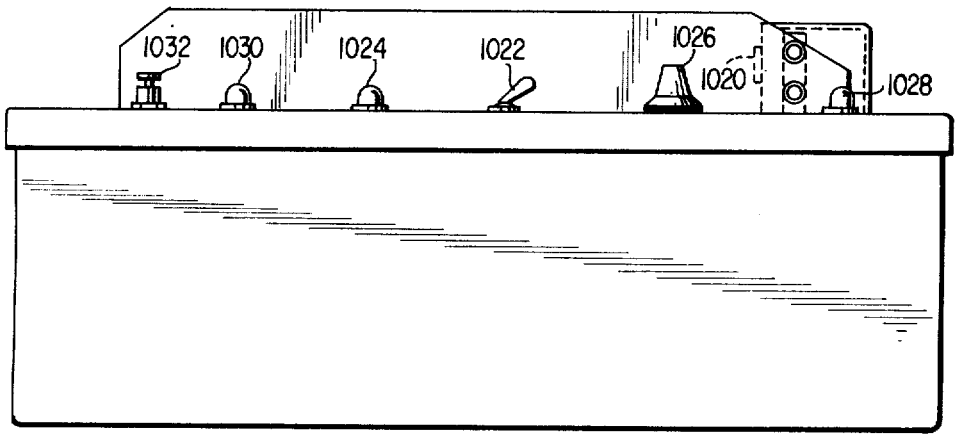
FIG. 7b is a side view of the structure of FIG. 7a and FIG. 7c is an end view showing the portable dataholder device received on the mounting rails of the structure of FIGS. 7a and 7b.
Figure 7C:
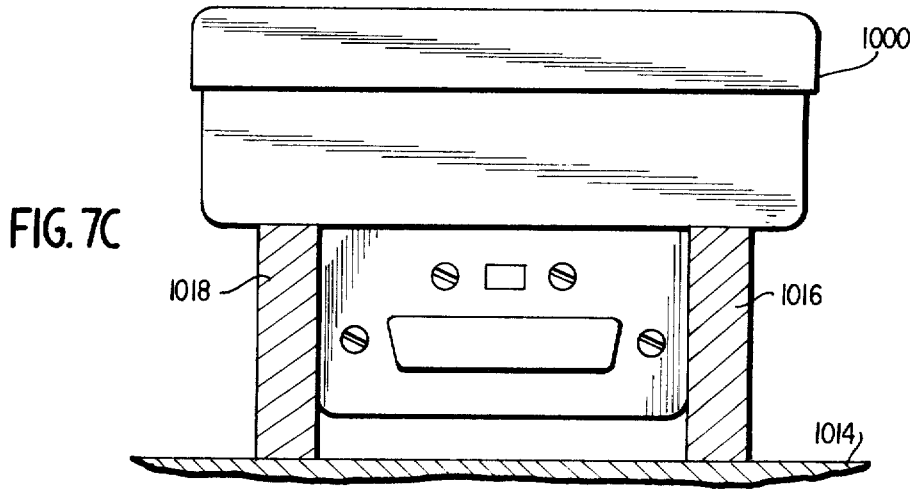

Referring to FIG. 7A, the housing 1012 for the interface and formatter circuits is shown in the planar view and, examined simultaneously with the side view of FIG. 7B, is seen to include an upper planar surface 1014 carrying 2 spaced apart vertical rails 1016 and 1018 having a connector 1020 extending therebetween and at one end of the housing 1012. The connector 1020 is positioned to mate with the connector plug 1010, as seen in FIG. 7C when the dataholder is received on the side rails and as may be visualized from the side views of FIGS. 6B and 7B thereby to provide an automatic electrical connection between the dataholder and the formatter and interface circuits.

Referring now to the control pushbuttons and the switches of the formatter unit, it will be recalled that the CLR pushbutton is depressed to clear temporary memory and to clear main memory only after initial power-up or following transmission of data from the main memory to the formatter. CLR also is pushed to unlock the keyboard after an overflow condition. The header key is depressed to enter the header code, displayed as an L and also to reset the line counter. The indicator key IND, when actuated, displays the number of lines, or records, in a given header and, when actuated a second time, enables the display of the data currently stored in the temporary memory. For convenience, a single button having this alternative or toggle-type display control function is preferred, although obviously separate suitably interlocked buttons could be employed in the alternative. Finally, the ENTR key, in the data collection functions, serves to transmit data from temporary to main memory. When the dataholder is connected to the formatter, actuation of this key transmits data from main memory to the formatter/interface circuits and thus to the further utilization device. In short, the dataholder is seen to be quite compact and to afford maximum flexibility in the input and verification of input data as well as in the readout of data therefrom and transmission to the utilization means.

The formatter, as well, is of uncomplicated construction, the parallel rail arrangement greatly facilitating mounting of the dataholder thereon and rapid interconnect through the matching plug arrangement. Power switch 1022 serves to turn on power to the formatter and a suitable indicator 1024 may be provided. The local/line switch 610a is shown at 1026 and the transmitting indicator shown in FIG. 4A as a light emitting diode 519 is shown at 1028, the latter serving to indicate that data is being transmitted from the formatter. The restart indicator comprising LED 523 of FIG. 4A is shown at 1030 and the restart switch 500 of FIG. 4A is shown at 1032, the function of the latter having been explained hereinabove.

In summary, the system of the invention achieves the desiderate of a true electronic notebook having greatly simplified data input operations with display and verification capabilities and is flexible in permitting design of essentially as great an amount of data storage capability as may be required. Connection of the dataholder to the interface/formatter circuit which may be at a remote station for communication to a central is of the utmost simplicity and the operation for reading out of the stored data requires actuation of essentially only a single switch, the data being read out in form which is both computer-compatible and suitable for transmission, totally avoiding the need for keypunch or other intervening operations.

A significant facet of the invention is that the input data, or information items, be they of the header lines or source data items, comprising the primary entries to be made by the user of the portable device, each block being initiated simply by depression of the header button L which stores a single block indication symbol, or signal, i.e., the header symbol L, in memory. Each line of items, by depressing IND, is readily displayed after entry for verification, as well as the number of the line in the block - - if in error, the line simply is cleared and re-entered - - if correct, depressing ENTR places the line in main memory and automatically enters a single line indication or line separation symbol, or signal. There is no fixed length of lines, and thus maximum use of memory is assured; since only a single block indication symbol and a single line symbol for each line of the block are employed, maximum storage of data items and minimum storage of control signals or symbols are accomplished. Regarding line lengths, note that a line is not limited to the number of characters capable of storage in temporary memory, and thus possible to display, but rather by simultaneously depressing ENTR and IND, the line indication symbol is inhibited and a line in excess of 18 or multiples of 18 characters may be entered.

The number of header lines is arbitrary, but use of eight with the last establishing the format of ensuing data lines has been found adequate for most applications. Some data, of course, may be entered in line positions normally receiving header information, as desired and established in initial programming of the format in which the information items which are entered are to be printed out and/or supplied to other utilization means.

A significant feature is that the system performs formatting independently of the dataholder device per se, again simplifying its construction and requisite storage capacity, minimizing as well its power requirements and enhancing its portability. A related feature of the invention is that the function of the "wire-wrap" programming of the formatter may be afforded in the alternative by a programmed diode matrix. Plural, differently programmed such matrices may be provided in a given formatter/interface unit, to be selected in accordance with the intended formatting of the information items collected in any of various different dataholders. Greater versatility of a given formatter thus is provided.

Whereas each portable device does not require internal formatting of stored data, the visual display produced thereby may be made to correspond. Thus in FIG. 6a, the character display positions may be spaced to display the characters in groups corresponding to the desired grouping of the source data items of each line. For standardizing production however, additional display positions in excess of the characters of a standard line may be provided and selectively connected for display of corresponding characters in the temporary memory with the desired groupings, visually creating thereby the desired format of the ultimate printout.

A highly significant feature is the capability of providing a properly formatted hard copy printout of the dataholder contents along with transmission of the stored data to a further utilization, a capability which is essential to many practical applications of the system.

Numerous modifications, adaptations and applications of the system of the invention will be apparent to those skilled in the art. The system is very versatile, as noted, permitting lines of any desired lengths, as measured by numbers of characters, and blocks of any desired number of lines. Any number of header lines having both character space and line space control may be accommodated, although a practical maximum may be known and thus pre-established. The desired format of character groupings, and thus spaces between groups, may be pre-established as desired. Since the portable device does not itself distinguish between header and source data items or lines, or the characters thereof, these are generally referred to as information items in the claims. Where the claim context requires, each "item" may constitute one or plural characters, and the grouping of items of a given format thus refers to successive groups, each of one or more characters, of a given line, be it a header or a source data line. Thus, it is intended by the appended claims to cover all such modifications, adaptations and applications which fall within the true spirit and scope of the invention.

What is claimed is:

1. In an electronic data collection system for collecting and storing information items including items of source data for subsequent supply of the stored data items to separate utilization means in block organization of at least one line of header information common to and identifying the origin of the source data and at least one line containing at least one source data item for each such block of data, a portable source data collection device for use in said system comprising:
 a keyboard having a control key selectively operable to enter a header symbol for each block of data and character keys for entering characters corresponding to information items of the header and source date lines;
 means responsive to each said key actuation to produce a respectively corresponding coded electrical signal;
 a solid state memory for receiving and storing the said coded electrical signals from said producing means responsive to key actuation and having a capacity of storing plural said lines of data for at least one said block thereof;
 said memory storing said signals from said producing means for each block including, in a predetermined relationship, the header symbol, the characters of a header line and a line designation symbol for each successive header line, and the characters of a source data line and a line designation symbol for each successive data line, means for selectively displaying the characters of at least a group of related characters of one of said lines as entered into said memory, and means for associating a portable electrical energy storing means with said portable data collection device to supply electrical energy therefrom to all of the aforesaid means, keyboard and memory comprising said data collection device.

2. A source data collection device as recited in claim 1, wherein:

said memory includes a temporary memory and a main memory, said temporary memory having a capacity of storing one said line of said lines of header information and source data, and said main memory having a capacity of storing plural said lines of header information and source data and associated header and line designation symbols for at least one said block;

said producing means is responsive to actuation of said control of character keys for entering the corresponding symbols into said temporary memory, and wherein said keyboard further includes a control key for transferring a line of characters as currently stored in said temporary memory to said main memory, and said producing means is responsive to actuation of said transfer control key to produce said line indication signal for storage in said main memory in sequence following the stored characters of the said line.

3. A source data collection device as recited in claim 2, wherein:

said keyboard further includes a clearing control key operable to clear data from said temporary memory.

4. A source data collection device as recited in claim 2, wherein:

said display means includes a number of character display positions corresponding to the number of character storage positions of said temporary memory, and said keyboard includes means selectively actuatable to produce a display on said display means of the current contents of said temporary memory.

5. A source data collection device as recited in claim 4, wherein there is further provided:

a counter for counting the number of lines entered for a given header, and said keyboard includes means selectively actuatable to display the number of lines stored in memory for a given header.

6. A source data collection device as recited in claim 5, wherein:

said selectively actuatable display producing means of said keyboard comprises a single control key having double actuation functions for selectively producing display of the temporary memory contents and alternatively of the number of lines.

7. An electronic data collection system employing the portable data collection device as recited in claim 1, and further comprising:

a readout means with which said device is selectively connectable for reading out the data from the main memory thereof and supply of that data to utilization means;

said readout means being responsive to a signal from said portable device when connected thereto to interrogate said memory and read out the signals stored therein in the corresponding related sequence of the storage positions of said signals.

8. A system as recited in claim 7, wherein:

said keyboard of said device further includes a transfer control key operable when actuated and when said device is connected to said readout means, to initiate transfer of the data from said memory to said readout means.

9. A system as recited in claim 7, wherein said readout means includes:

means for responding to each header symbol to recognize the initiation of each new block of data in readout of said memory, and means for formatting the character data readout from memory in accordance with a programmed, desired format of presentation of the data.

10. A system as recited in claim 9, wherein:

said readout means further includes means operable upon said responding means recognizing a subsequent header symbol in readout of said memory to temporarily terminate further transfer of data from said memory, and switch means operable to initiate readout following each such temporary termination, whereby each stored block of data is read out individually and selectively, in sequence.

11. A system as recited in claim 10, wherein:

said utilization means includes means for producing a printout of the data, the individual readout of such block of data enabling said printout producing means to print a separate record of each data block.

12. A system as recited in claim 9, wherein:

said formatting means includes means selectively programmable to establish for each block of data as read out from said memory of said portable device a desired format for supply of the data to the utilization means, the format including at least the provision of character spaces at selected positions in each line to effect grouping of the characters of each given line as supplied to said utilization means, and said readout means further includes control means for reading each character symbol from memory in individual, controlled succession, means for counting each such character symbol in each line, and means responsive to the character count of each line and the desired format of that line for inserting a space symbol in each programmed position of the line thereby to supply to said utilization means a sequence of character and inserted space signals corresponding to the programmed format of the data for that line.

13. A system as recited in claim 12, wherein the formatting of said selectively programmable means includes the provision of line spaces between successive lines of characters as supplied to said utilization means and wherein said readout means further comprises:

means for responding to and counting each line symbol as read out from memory, and said formatting means includes means responsive to the line count to insert a further signal representative of an end of line symbol for each programmed line space in the sequence of signals to be supplied to said utilization means.

14. A system as recited in claim 13, wherein said formatting means includes means for establishing for a predetermined number of lines, individually programmed character and line space formats and for all lines in excess of said predetermined number, a common programmed format.

15. A system as recited in claim 14, wherein said line counter means identifies attainment of a count of said predetermined number and said formatting means responds thereto to format each succeeding line in accordance with said common format.

16. A system as recited in claim 12, wherein the utilization means comprises a printer responsive to the sequence of signals produced by said readout means and responsive to each character symbol signal to print the corresponding character and to each space symbol to leave a corresponding space in each such line, said readout means further includes means for producing an end of line sequence in response to each line indication symbol thereby to produce in the sequence of output signals a carriage return signal and a line advance signal, and said printer responds to the carriage return signal to return to an initial position for printing a subsequent line and to the line advance signal to advance to a successive line prior to initiating printing of characters on such successive line.

17. A system as recited in claim 16, wherein said readout means further includes means operable upon said responding means recognizing a subsequent header symbol in readout of said memory to temporarily terminate further transfer of data from said memory, said printer thereby terminating further printout of data upon completition of printout of data for a given data block, and said readout means further includes switch means operable to initiate readout following each such temporary termination, whereby said printer is selectively controlled to print each block of data on individual data records for all blocks of data stored in a given data collection device.

18. An electronic data collection system for collecting and storing items of information including source data items for subsequent automatic supply of the source data in a desired format to separate utilization means, and wherein a block of items includes plural lines, each of plural items, comprising:

a portable data collection device including: means for entering an indication of each new block of items to be collected and of each item of each line of that block, said entering means producing coded electrical signals representative of the block indication and the information items and an indication of each line of said items, means for receiving and storing the coded electrical signals produced by said entering means in accordance with a predetermined sequential organization of the signals to store in sequence, the block identification signal, and the items of each line and the related line indication signal, for each line of the block, and means with which said portable device is selectively connected and operable for reading out the stored signals from the receiving and storing means of a device connected thereto, said reading means including means for formatting the stored signals as read out, in accordance with a pre-established desired format for the data signals as read from a given portable device, for supply of the data in the desired format to the utilization means, said reading means responding to each block indication signal to control said formatting means to format the corresponding block of information items in each of successive lines of the block in accordance with the same pre-established format for each block, said reading means being responsive to the stored block indication signal to recognize each new block of data as read from said storing means, for supply thereof to said utilization means.

19. A portable data collection device as recited in claim 18, wherein:

said receiving and storing means comprises a plurality of successive storage positions of fixed sequence, and said receiving and storing means receives and stores the signals in the sequence of entering thereof to indicate in sequence the block identification signal, the information item signals of each line and the related line indication signal for each line of a block in succession, and said reading out means responds to the block and indication line signals thus stored by said receiving and storing means to recognize each block and each successive line of items of each block.

20. A portable data collection device as recited in claim 19, wherein said entering means comprises a keyboard having key switches of predetermined designations corresponding to the block identification and the information items to be entered.

21. A portable data collection device as recited in claim 18, wherein:

said entering and storing means includes a first memory of a predetermined number of storage positions for receiving and storing therein a corresponding number of information item signals from said entering means in the sequence in which each said item is entered, and there is further provided a second memory having a storage capacity of multiples of said first memory, and said entering means includes means for transferring each item stored in said first memory to said second memory, said transferring means automatically generating said line indicating signal for storing in said second memory in sequence with the items transferred from said first memory.

22. A portable data collection device as recited in claim 21, wherein there is further provided:

display means having a number of display positions corresponding to the number of storage positions of said first memory for displaying each item in the sequence as stored in said first memory, and means for selectively enabling display of the items stored in said first memory on said display.

23. A portable data collection device as recited in claim 21, wherein there is further provided:

means for selectively inhibiting said transfer means from generating a line indicating signal in the transfer of items from said first to said second memory, thereby to permit each line of items to include a number of items in excess of the number of storage positions of said first memory.

24. A portable data collection device as recited in claim 21 wherein said second memory has a predetermined maximum capacity and wherein there is further provided means for determining when the contents of said second memory are approaching the full capacity thereof for generating a warning signal indicating this condition.

25. A portable data collection device as recited in claim 24, wherein there is further provided means responsive to the said warning signal to generate a display in said display means to indicate the condition of approaching the full capacity of the main memory.

26. A portable data collection device as recited in claim 24, wherein there is further provided
means for counting the number of line indication signals and thereby determining the number of lines transferred to said main memory, and
means for selectively displaying the said line count on said display means.

27. A portable data collection device as recited in claim 26, wherein said selective display means selectively controls predetermined ones of the character display positions of said display means for selective display of the line count in lieu of display of the items of information stored in said first memory.

28. A data collection device as recited in claim 18, wherein said reading out means comprises means for responding to each block indication signal to indicate to said utilization means each successive block of items of source data information and means for responding to each line indicating signal to identify each successive line of items, thereby to control the formatting of the items as supplied to the utilization device.

29. A portable data collection device as recited in claim 18, wherein said reading out means comprises:
formatting means establishing, for a predetermined number of lines of information items in each block, a prescribed format of the items of information, and
means for recognizing each line of information as read from said main memory in succession to identify the number of that line and thereby to organize the items of information of that line in accordance with the prescribed format for that line.

30. A portable data collection device as recited in claim 29, wherein said reading out means further comprises means for establishing a prescribed format of each line of information read from said second memory in excess of a predetermined number of said lines thereby to establish a prescribed format of the individual said line and each successive line thereafter.

31. An electronic data collection system as recited in claim 18 wherein said formatting means automatically formats the information items read from said storing means in accordance with grouping of the items and spacing of the grouped items in each of successive lines of each block,
said formatting means including means programmable to establish a desired format for each of successive lines of a block and means responsive to the block indication signal and to each successive line indication signal of each block to insert space signals between the information item signals read from said storing means thereby to establish the desired format of grouping and spacing of information items for each line of the block.

32. An electronic data collection system as recited in claim 31, wherein:
said programmable means of said automatic formatting means includes means for separately programming a desired format for each line of a predetermined number of lines of each block, and
said means responsive to the block and line indication signals identifies each successive line of items thereby to select from said programmable means the respectively corresponding programmed format.

33. An electronic data collection system as recited in claim 32, wherein:
said programmable means establishes a single, common programmable format for each line in excess of said predetermined number, and
said means responsive to the block and line indication signals identifies and programs each successive line of a block in excess of said predetermined number in accordance with said single, common programmed format.

34. An electronic data collection system as recited in claim 33, wherein the information items include both header information items relating to the block in general and source data items, and wherein
said header items are contained in a number of lines no greater than said predetermined number, and each line of header information is individually programmed as to format, and
said data items are contained in lines of said block following said header lines and are programmed in common as to format.

35. A self-contained, hand-held portable data collection device for receiving and storing source data and for subsequent read-out and transmission of the source data to a utilization means, comprising:
entry means including a keyboard having a plurality of keys selectively actuable for producing coded electrical signals representative of corresponding source data characters and controls for said device,
means including a solid state memory for receiving and storing coded electrical signals from said entry means, corresponding to the source data characters of plural lines of source data,
means for selectively displaying characters of at least one line of source data as stored in said memory,
means for reading out said memory for supplying the coded electrical signals corresponding to the characters of said at least one line of source data to said displaying means, and
electrical energy storing means integral with said self-contained hand-held portable data collection device for supplying electrical energy to the aforesaid means for operation of the said device.

36. A portable data collection device as recited in claim 35 wherein:
said memory includes a temporary memory and a main memory, said temporary memory having a capacity of storing one said line of source data and said main memory having a capacity of storing plural said lines of source data,
said keyboard further includes a control key for transferring a line of source data as currently stored in said temporary memory to said main memory, for each of a plurality of successive, individual lines of source data stored in said temporary memory.

37. A portable data collection device as recited in claim 35 wherein each said line of data includes plural said source data characters.

38. A portable data collection device as recited in claim 35 for use in connection with an electronic data collection system, said system further comprising means for reading out said memory of said portable data collection device for transmitting the said stored source data form said memory of said portable device in a desired format to a utilization means.

39. A system as recited in claim 38 wherein said format transmission means is selectively programmable to a desired format.

40. An electronic data collection system for collecting and storing plural lines of source data, each said line including at least one source data item, wherein said plural lines of source data are to be subsequently automatically supplied in a desired format to separate utilization means, comprising:
- a portable, self-contained, hand-held source data collection device including:
  - entry means including a keyboard having a plurality of keys selectively actuable for producing coded electrical signals representative of source data and controls,
  - a solid state memory for receiving and storing coded electrical signals form said entry means,
  - means for selectively displaying a line of source data as stored in said memory, and
- means with which said portable device is selectively connected, operable for reading out the said source data as stored in said memory of said portable device and transmitting the read-out data in a desired format to a utilization means.

41. A system as recited in claim 40 wherein said read-out and transmitting means includes means selectively programmable for transmitting said source data in said desired format.

42. In an electronic data collection system for collecting and storing information items including items of source data for subsequent supply of the stored, source data items to separate utilization means in block organization of at least one line of header information common to and identifying the origin of the source data and at least one line containing at least one source data item for each such block of source data, a portable source data collection device for use in said system comprising:
- a keyboard having a control key selectively operable to enter a header symbol for each block of data and character keys for entering characters corresponding to information items of the header and source data lines;
- means responsive to each said key actuation to produce a respectively corresponding coded electrical signal;
- a memory for receiving and storing the said coded electrical signals from said producing means responsive to key actuation, said memory including a temporary memory and a main memory,
- said producing means being responsive to actuation of said control and character keys for entering the corresponding symbols and characters into said temporary memory,
- said keyboard further includes a control key for transferring a line of characters as currently stored in said temporary memory to said main memory,
- said producing means b ing responsive to actuation of said transfer cont  l key to produce a line indication signal for sto age in said main memory in sequence following the stored characters of the corresponding line,
- said main memory storing the signals transferred thereto in a desired predetermined relationship of the header symbol, the characters of a header line and a line designation symbol for each successive header line, and the characters of a source data line and a line designation symbol for each successive data line,
- means for selectively displaying the characters of at least a group of related characters of one of said lines as entered into said temporary memory, said display means including a number of character display positions corresponding to the number of character storage positions of said temporary memory, said keyboard including selectively actuable means, and said selective displaying means being responsive to actuation of said selectively actuable means to produce a display on said display means of the current contents of said temporary memory,
- a counter for storing the number of lines entered for a given header, and
- said selective displaying means is responsive to further actuation of said selectively actuable means of said keyboard to display the count of said counter thereby to indicate the number of lines stored in said main memory for a given header.

43. A source data collection device as recited in claim 42 wherein said selectively actuable means of said keyboard comprises a single control key having double actuation functions for selectively controlling said selective display means to display the contents of said temporary memory and alternatively to display the number of lines.

44. An electronic data collection system for collecting and storing information including items of source data for subsequent supply of the stored data items to separate utilization means in block organization including at least one line of header information common to and identifying the origin of the source data and at least one line containing at least one source data item for each such block of data, comprising:
- a portable source data collection device for use in said system comprising:
  - a keyboard having a control key selectively operable for producing a header symbol for each block of data and character keys for entering characters corresponding to information items of the header and source data lines;
  - means responsive to each said key actuation to produce a respectively corresponding coded electrical signal;
  - a memory for receiving and storing the said signals from said producing means for each block, corresponding to said information items of the header and source data lines, in a predetermined relationship, and
  - means for selectively displaying the characters of at least a group of related characters of one of said lines, stored in said memory, and
- read-out means with which said device is selectively connectable for reading out the data from said memory and supply of that data to utilization means, said read-out means being responsive to a signal from said portable device when connected thereto for interrogating said memory and reading out the signals stored therein.

45. A system as recited in claim 44, wherein:

said keyboard of said device further includes a transfer control key operable when actuated to produce said signal from said portable device to which said read-out means is responsive, thereby to initiate the read-out of said memory by said read-out means for supply of the data stored therein to said utilization means, 46. A system as recited in claim 44, wherein said read-out means includes:

means for responding to header information read out from said memory to recognize each new block of data being read out from said memory, and means for formatting the character data from said memory in accordance with a programmed, desired format of presentation of the data.

47. A system as recited in claim 46, wherein:

said read-out means further includes means operable upon said responding means recognizing subsequent header information during read-out of said memory to terminate temporarily further transfer of data from said memory, and switch means operable to initiate read-out following each such temporary termination, whereby each stored block of data is read out individually and selectively, in sequence.

48. A system as recited in claim 46, wherein:

said utilization means includes means for producing a print out of the data, the individual read-out of each block of data enabling said print out producing means to print a separate record of each data block.

49. A system as recited in claim 46, wherein:

said formatting means includes means selectively programmable to establish for each block of data as read out from said memory of said portable device, a desired format of said data for supply to said utilization means, the formatting including at least the provision of character spaces at selected positions in each line to effect grouping of the characters of each given line as supplied to said utilization means, and said read-out means further includes control means for reading each character symbol from memory individual, controlled succession, means for counting each such character symbol in each line, and means responsive to the character count of each line and the desired format of that line for inserting a space symbol in each programmed position of the line thereby to supply to said utilization means a sequence of character and inserted space signals corresponding to the programmed format of the data for that line.

* * * * *

UNITED STATES PATENT OFFICE
CERTIFICATE OF CORRECTION

Patent No. 3,942,157         Dated March 2, 1976

Inventor(s) Leo L. Azure, Jr.

It is certified that error appears in the above-identified patent and that said Letters Patent are hereby corrected as shown below:

At "/75/" change "Leo L. Azure" to --Leo L. Azure, Jr.--.
Column 2, line 49, cancel "handheld" and insert --hand-held--.
Column 5, line 20, cancel "mmemory" and insert --memory--.
Column 7, lines 20 and 21, cancel "A TEMP" and insert --A TEMP--.
Column 10, line 15, cancel "Pulse" and insert --pulse--.
Column 11, line 1, cancel "Pulses" and insert --pulses--.
Column 13, line 20, cancel "$^-2$" insert --$\phi_2$--.
Column 16, line 40, cancel "interfaceformatter" and insert --interface-formatter--.
Column 20, line 15, cancel "desiderata" and insert --of--.
Column 20, line 31, cancel "seen" and insert --seem--.
Column 22, line 11, cancel "front" and insert --font--.
Column 24, line 56, cancel "date" and insert --data--.
Column 31, line 6, cancel "form" and insert --from--.

Signed and Sealed this

Twentieth Day of July 1976

[SEAL]

Attest:

RUTH C. MASON  
*Attesting Officer*

C. MARSHALL DANN  
*Commissioner of Patents and Trademarks*

UNITED STATES PATENT AND TRADEMARK OFFICE
CERTIFICATE OF CORRECTION

PATENT NO. : 3,942,157
DATED : June 24, 1976
INVENTOR(S) : Leo L. Azure, Jr.

It is certified that error appears in the above-identified patent and that said Letters Patent are hereby corrected as shown below:

Column 2, line 49, change "handheld" to --hand-held--.

Column 7, lines 20 and 21, change "A̅ T̅E̅M̅P̅" to --A TEMP--.
Column 10, line 15, change "Pulse" to --pulse--.
Column 14, line 11, change "(0101)" to --("0101")--; change "0" to --"0"--.
Column 16, line 23, change "(0111)" to --("0111")--.
Column 17, line 29, change "(0011)" to --("0011")--.
Column 22, line 1, change "front" to --font--.
Column 23, line 1, change "desiderate" to --desiderata--.
Column 24, line 56, change "date" to --data--.
Column 31, line 6, change "form" to --from--.

*Signed and Sealed this*

*Twenty-first* Day of *September* 1976

[SEAL]

*Attest:*

RUTH C. MASON
*Attesting Officer*

C. MARSHALL DANN
*Commissioner of Patents and Trademarks*